United States Patent
Grisleri

(10) Patent No.: US 11,531,197 B1
(45) Date of Patent: Dec. 20, 2022

(54) CLEANING SYSTEM TO REMOVE DEBRIS FROM A LENS

(71) Applicant: Ambarella International LP, Santa Clara, CA (US)

(72) Inventor: Paolo Grisleri, Roveleto di Cadeo (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 17/083,401

(22) Filed: Oct. 29, 2020

(51) Int. Cl.
G02B 27/00 (2006.01)
H04N 5/232 (2006.01)
G06V 20/00 (2022.01)

(52) U.S. Cl.
CPC ......... *G02B 27/0006* (2013.01); *G06V 20/00* (2022.01); *H04N 5/23264* (2013.01)

(58) Field of Classification Search
CPC ........... G02B 27/0006; G06K 9/00624; H04N 5/23264
See application file for complete search history.

(56) References Cited

U.S. PATENT DOCUMENTS

| | | | | |
|---|---|---|---|---|
| 7,071,964 B1* | 7/2006 | Glatt | ................. | H04N 5/23238 348/36 |
| 7,433,497 B2* | 10/2008 | Chen | ......................... | G06T 7/20 348/E5.046 |
| 7,643,063 B2* | 1/2010 | Trescott | ................. | G03B 39/00 348/208.5 |
| 9,288,374 B1* | 3/2016 | Cooper | .............. | H04N 5/23225 |
| 2007/0280091 A1* | 12/2007 | Apel | ...................... | G02B 7/026 369/275.1 |
| 2012/0032557 A1* | 2/2012 | Furuta | ...................... | B08B 7/02 310/317 |
| 2015/0036037 A1* | 2/2015 | Reed | .................... | H04N 5/2171 348/340 |
| 2017/0104979 A1* | 4/2017 | Shaw | .................... | H04N 13/239 |
| 2017/0131542 A1* | 5/2017 | Inukai | .................. | H04N 5/2254 |
| 2019/0302472 A1* | 10/2019 | Chapman | ............. | G02B 27/646 |
| 2019/0322245 A1* | 10/2019 | Kline | ...................... | B60S 1/486 |
| 2019/0327391 A1* | 10/2019 | Jaggi | ................ | H04N 5/232941 |
| 2021/0192229 A1* | 6/2021 | Johnson | .............. | G06K 9/0063 |

OTHER PUBLICATIONS

Adam Clark Estes, "McLaren Is Using Fighter Jet Technology for Wiper-free Windshields", Gizmodo, Dec. 16, 2013, https://gizmodo.com/mclaren-is-using-fighter-jet-technology-for-wiper-free-1484213049.

(Continued)

*Primary Examiner* — James T Boylan
(74) *Attorney, Agent, or Firm* — Christopher P. Maiorana, PC

(57) ABSTRACT

An apparatus including a cover, an actuator and a processor. The cover may be configured to enable light to reach an image sensor. The actuator may be configured to cause a vibration of the cover at a particular frequency. The processor may be configured to generate image frames from pixel data generated by the image sensor and present a control signal to the actuator in response to an input. The input may activate the vibration at the particular frequency. The particular frequency of the vibration may cause debris to be removed from the cover.

18 Claims, 12 Drawing Sheets

(56) References Cited

OTHER PUBLICATIONS

"McLaren's ultrasonic force field to replace windshield wipers", New Atlas, Dec. 24, 2013, https://newatlas.com/mclaren-ultrasonic-windshield-wiper-washer/30205/.
Will Dron, "https://www.driving.co.uk/news/news-mclaren-waves-goodbye-to-windscreen-wipers-with-ultrasonic-tech/", Sunday Times Driving, Dec. 17, 2013, https://www.driving.co.uk/news/news-mclaren-waves-goodbye-to-windscreen-wipers-with-ultrasonic-tech/.
"Ultrasonic sensor cleaner: what is it and how does it work?", Dec. 30, 2016, What Digital Camera, https://www.whatdigitalcamera.com/technical-guides/technology-guides/ultrasonic-sensor-cleaner-what-is-it-and-how-does-it-work-66172.

\* cited by examiner

CLEANING SYSTEM TO REMOVE DEBRIS FROM A LENS

FIELD OF THE INVENTION

The invention relates to camera systems generally and, more particularly, to a method and/or apparatus for implementing a cleaning system to remove debris from a lens.

BACKGROUND

Cameras are used for various types of applications, such as surveillance, maneuvering aid (i.e., driver assistance) or autonomous driving. A surveillance camera that cannot clearly capture an image has limited usefulness. Autonomous vehicles will have a limited ability to detect objects without clear images. Camera lenses, particularly for cameras located in outdoor environments, can be exposed to various types of debris. Debris (i.e., dirt, dust, rain drops, snow, etc.) can obscure the images captured by a camera.

If not removed, rain drops, dirt and debris in general have a tendency to deposit over the external surface of the most external element of the camera lens causing a degradation of the image quality provided by the camera. Usually the result of a rain drop or other debris on the lens is the presence a blurred/obscured area in the image taken by the camera that makes distinguishing the content of the covered image portion difficult or impossible. Difficulty distinguishing content can be a problem for both artificial vision systems or humans that need to interpret the image content for various purposes (i.e., detecting a potential threat in the area surveilled by the camera, parking a car near a location of an obstacle captured by a camera mounted on a vehicle, etc.).

There are several conventional methods for cleaning lenses. A wiper may be installed on the front glass of a camera enclosure, or on the lens. However, using a wiper results in an extra external component. The wiper will also add another obstacle in the image captured while cleaning. A nozzle to spray a liquid, air, or a mixture of liquid and air on the lens surface can be used to remove debris. A nozzle also involves an extra external component as well as a tank or compressor to distribute the liquid or gas. The liquid or gas used can also result in image distortion (and might need a wiper to clear the liquid). A rotating glass in front of the lens can remove debris using a centrifugal force. A rotating glass is also another external element that can cause image distortion. A glass element in front of the lens can also result in reflections, which further cause distortions to the captured image.

It would be desirable to implement a cleaning system to remove debris from a lens.

SUMMARY

The invention concerns an apparatus comprising a cover, an actuator and a processor. The cover may be configured to enable light to reach an image sensor. The actuator may be configured to cause a vibration of the cover at a particular frequency. The processor may be configured to generate image frames from pixel data generated by the image sensor and present a control signal to the actuator in response to an input. The input may activate the vibration at the particular frequency. The particular frequency of the vibration may cause debris to be removed from the cover.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
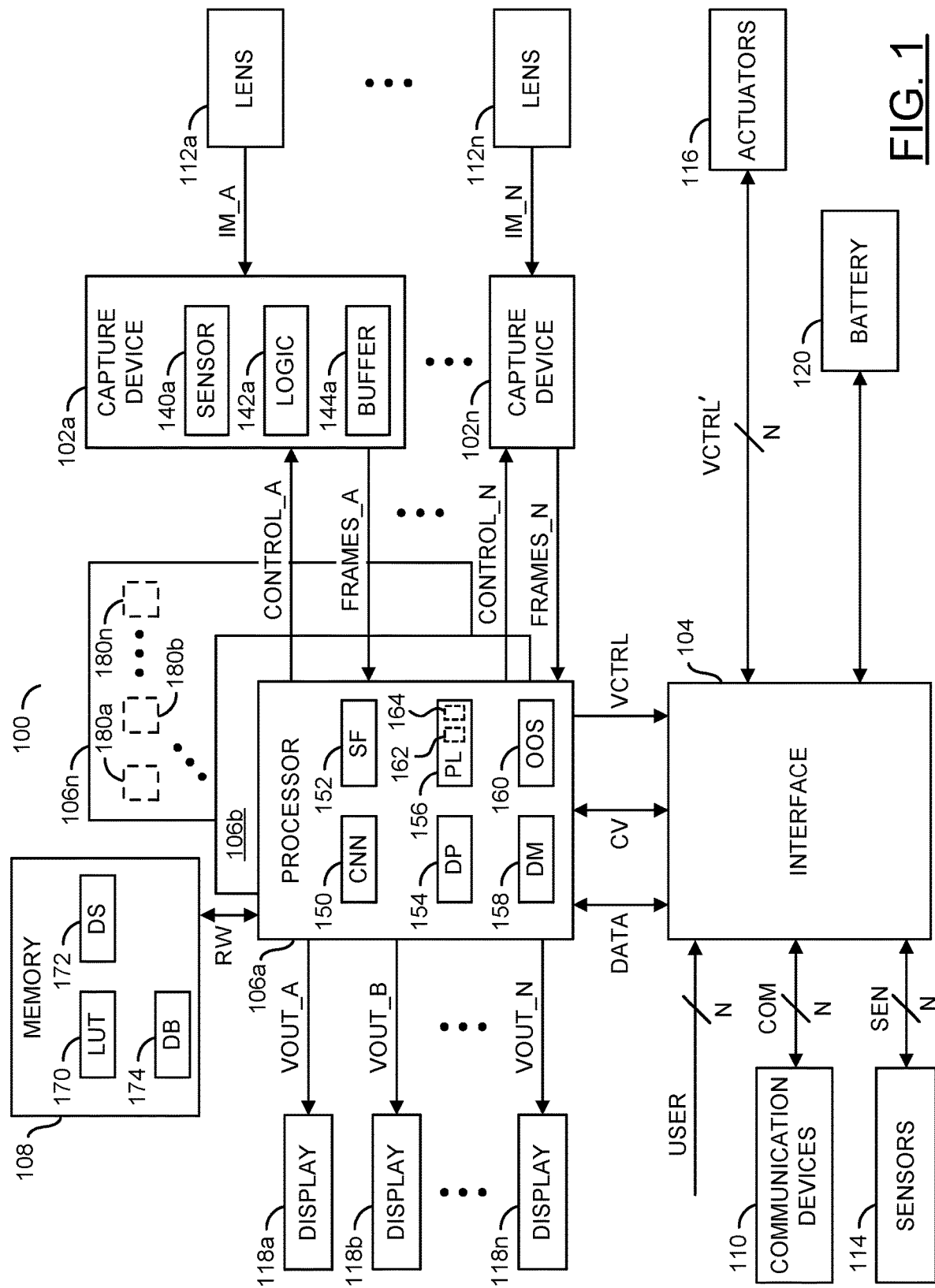
FIG. 1 is a diagram illustrating an embodiment of the present invention.

Embodiments of the present invention include providing a cleaning system to remove debris from a lens that may (i) automatically remove rain drops, dust, dirt and snow from a camera lens, (ii) provide a clean image for further video processing or human evaluation, (iii) be implemented without an additional external element, (iv) leverage the force of gravity to remove debris, (v) be implemented as a waterproof system, (vi) avoid adding additional distortion while cleaning the camera lens, (vii) automatically clean the lens in response to detected debris, (viii) compensate for the applied vibration in the output images, (ix) remove debris from a camera lens or other protective cover for a camera and/or (x) be implemented as one or more integrated circuits.

Embodiments of the present invention may be configured to implement a cleaning system for a camera. The cleaning system may be configured to automatically remove debris (e.g., rain drops, mud, dust, snow, etc.) from the most external lens element. The debris may cause an obstruction and/or obscure the output images (or video frames) generated by the camera. Removing debris may enable the camera to generate a clean (or clear) image. The clean image may be used for further video processing and/or human evaluation.

The cleaning system may be implemented by generating a vibration of the camera and/or camera lens. The vibration may result in the lens being shaken at a particular frequency to reduce the force that attaches the debris to the lens surface. When the force of the vibration causes the force that attaches the debris to the lens surface to loosen, then the debris particle(s) may drop down in response to gravitational forces.

Embodiments of the present invention may be configured to remove debris without adding external elements to clean the camera lens. For example, the force of gravity may be leveraged to remove the debris without any additional visible external element. The cleaning system may be free from constraints caused by external cleaning elements. For example, no distortion elements may be added in front of the lens such as a rotating element or a wiper element. In another example, the present invention may be implemented without a distribution system (e.g., a tank, a pump, a compressor, etc.) for distribution of liquid and/or gases to blow onto the lens. A distribution system may result in a large power draw compared to vibrating the camera. In still another example, a rotating glass may have different distortions based on the rotational position of the rotating glass, which may cause different types of distortions at different times. Different types of distortions at different times may be difficult to predict and/or correct in the captured images.

By implementing the cleaning system without external elements, additional issues may be avoided such as unwanted artifacts, unwanted reflections (e.g., caused by an external glass element), accumulated moisture (e.g., caused by an external glass element that may result in a temperature difference between inside and outside the enclosure). The additional issues such as moisture and unwanted reflections may negatively affect image quality captured by the camera.

The cleaning system may be implemented by causing the lens (or external part of the camera, such as a protective cover) to shake. In an example, the shaking may remove casual drops that may remain on the lens after rain. Other debris that may not be strongly attached to the external glass or lens may also be removed. The shaking may be caused by generating a vibration at a particular frequency. In one example, the particular frequency may be 30 kHz.

In some embodiments, computer vision may be implemented to detect the presence of debris. The vibration may be generated in response to the computer vision detecting the debris on the lens surface. In some embodiments, the vibration may be generated in response to a manual activation (e.g., receiving an input from an external source). For example, an operator (e.g., a person viewing a live stream of surveillance footage, a driver using a reverse camera to perform a backup maneuver, etc.) may see the debris obstructing the output images of the camera and manually activate the vibration to perform a cleaning (e.g., on-demand cleaning).

In some embodiments, the generation of images may be temporarily paused while cleaning is in progress. The vibration may result in a temporary distortion of the output images. Temporarily pausing the generation of images until cleaning is complete may prevent the distortion. For example, a temporary pause may be suitable for low-priority camera systems (e.g., surveillance, a back-up camera on a vehicle, an action camera, a wearable camera, etc.).

In some embodiments, implementing a temporary pause may not be acceptable (e.g., autonomous driving). Video processing techniques may be implemented to counteract the distortion caused by the vibration. In an example, the camera system may implement optical image stabilization that may be used to correct the distortion caused by the vibration of the lens/cover. Since the vibration may be performed at a particular frequency, the type of correction to perform may be known in advance (e.g., consistent and/or predictable movement) to enable application of the countermeasures as soon as the cleaning system is activated. In another example, the sensor may be stabilized to prevent and/or reduce negative effects caused by the vibration (e.g., a five axes actuation may be performed in an image sensor).

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n.

Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL A-CONTROL N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL A-CONTROL N may comprise instruction signals for the capture devices 102a-102n and/or the lenses 112a-112n (e.g., to zoom, pan, focus, adjust settings, etc.). The signals CONTROL A-CONTROL N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL A-CONTROL N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 both may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
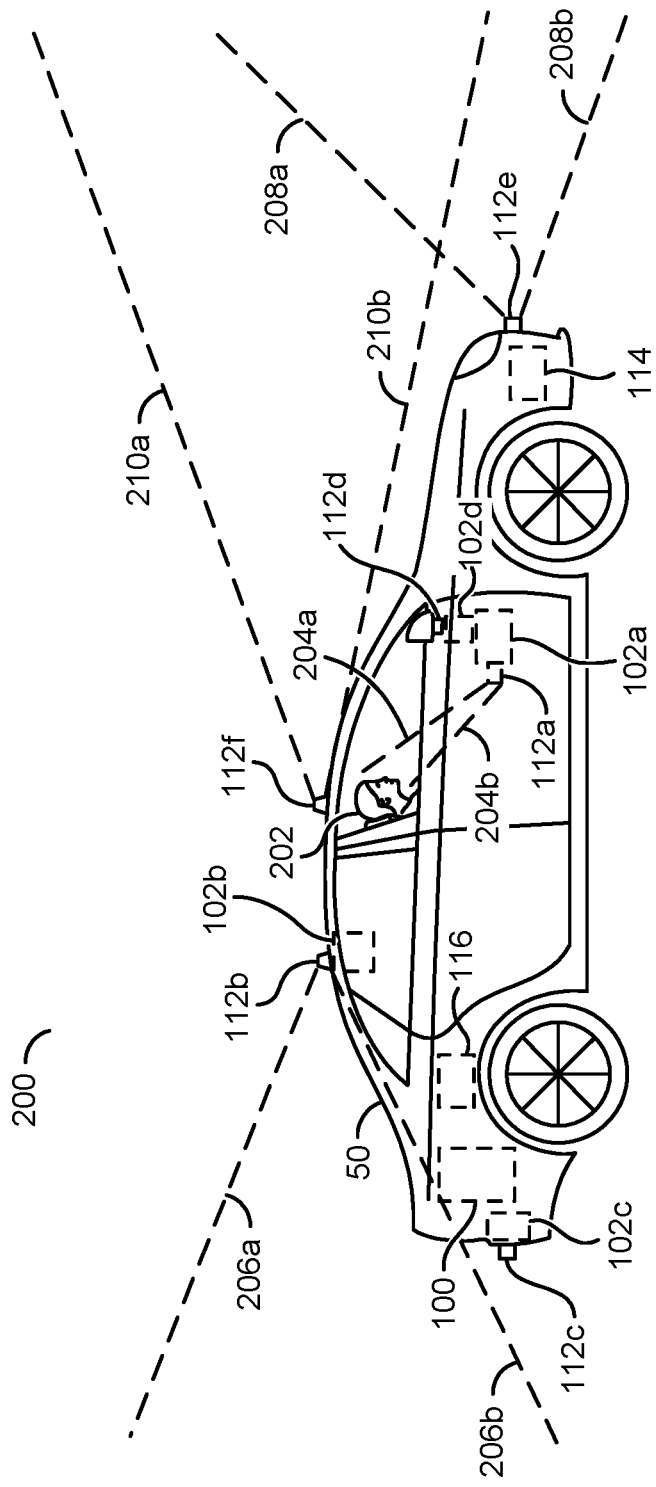
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
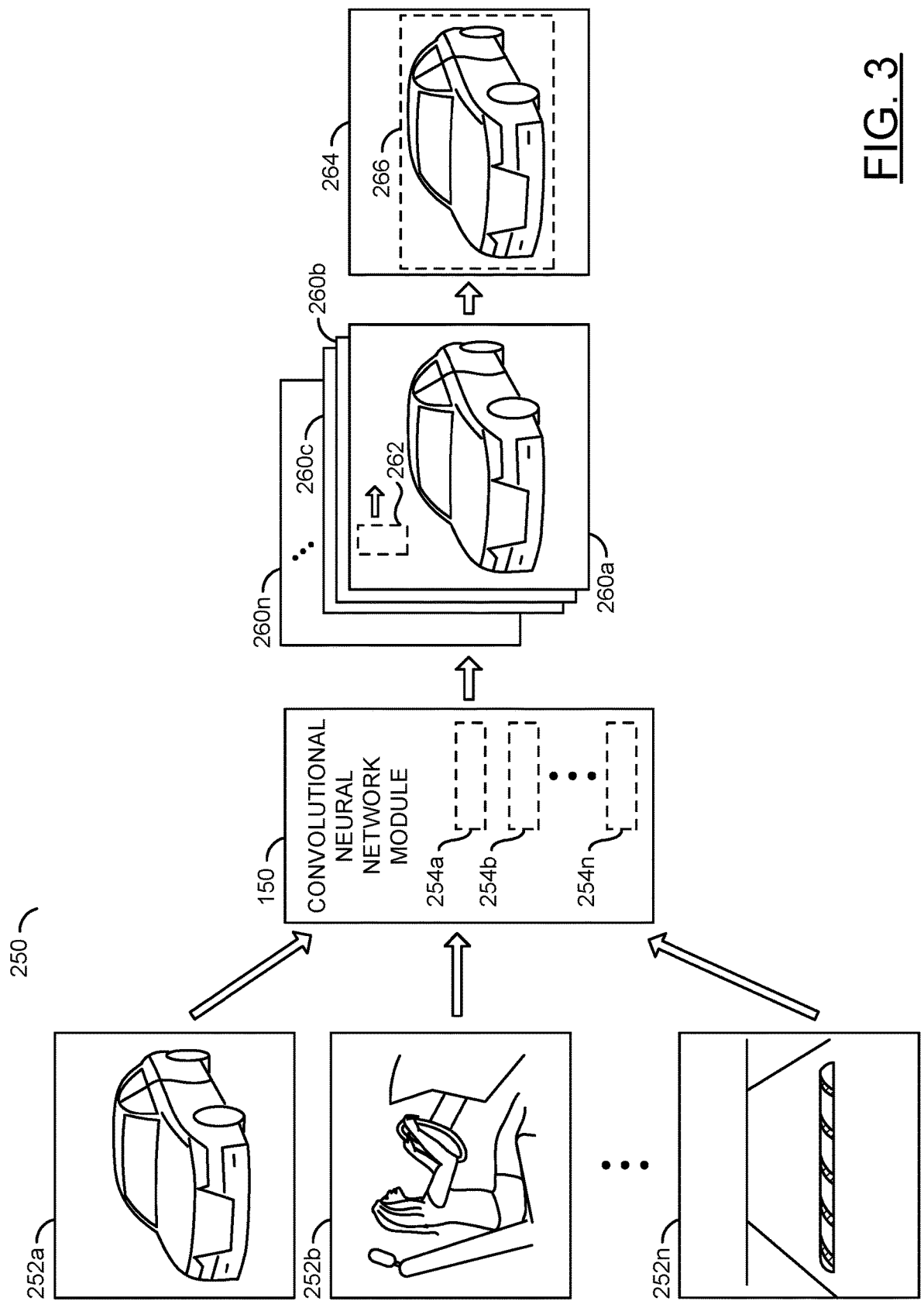
FIG. 3 is a diagram illustrating computer vision operations.

Referring to FIG. 3, a diagram illustrating an example visualization of training a convolutional neural network for object detection is shown. A training and/or object detection visualization 250 is shown. The training and/or object detection visualization 250 may comprise the CNN module 150. Image and/or video frames 252a-252n are shown. The images and/or video frames 252a-252n may be training data. In one example, the training data 252a-252n may be generated by the processors 106a-106n in response to pixel data captured by the capture devices 102a-102n. In another example, the training data 252a-252n may be image data from other sources (e.g., images previously captured by the camera system 100, images received from a database of images (e.g., stock images), images captured by a fleet of vehicles and uploaded to a database of images, etc.). The source of the training data 252a-252n may be varied according to the design criteria of a particular implementation.

To detect objects using computer vision, the convolutional neural network 150 may be trained using the training data 252a-252n. The training data 252a-252n may comprise a large amount of information (e.g., input video frames). The training data 252a-252n may be labeled. The labels for the training data 252a-252n may be provided as metadata of the video frames. Labeling the training data 252a-252n may enable the CNN module 150 to have a ground truth basis for determining which objects are present in the training data 252a-252n.

The CNN module 150 is shown comprising blocks (or circuits) 254a-254n. The blocks 254a-254n may implement artificial intelligence models. The artificial intelligence models 254a-254n may be configured to be trained to detect particular objects. Each of the artificial intelligence models 254a-254n may be trained to recognize, classify and/or distinguish one or more types of objects. The number of artificial intelligence modules 254a-254n implemented by the CNN module 150 and/or the type(s) of objects detected by each one of the artificial intelligence models 254a-254n may be varied according to the design criteria of a particular implementation.

In the example shown, the training data 252a may comprise an image of a vehicle, the training data 252b may comprise an image of a driver and the training data 252n may comprise an image of a road obstacle (e.g., a speedbump). In one example, the training data 252a may comprise a label indicating that the video frame comprises a vehicle. In another example, the training data 252a may comprise a label indicating that the video frame comprises a particular make/model/year of a vehicle. If the artificial intelligence model 254a is configured to detect vehicles, the training data image 252a may provide a ground truth sample of a vehicle and the training data 252b may be an example image of objects that are not a vehicle. If the artificial intelligence model 254b is configured to detect a driver (or driver behavior), the training data 252b may provide a ground truth sample of a person performing a particular behavior (e.g., driving).

The artificial intelligence models 254a-254n may be trained in response to the training data 252a-252n when the CNN module 150 operates in the training mode of operation. In one example, the artificial intelligence models 254a-254n may be directed acyclic graphs. In the training mode of operation, the artificial intelligence models 254a-254n may analyze many examples of objects. In one example, if the artificial intelligence model 254a is configured to detect vehicles, the artificial intelligence model 254a may analyze many examples of vehicle images. Training the artificial intelligence models 254a-254n may determine and/or calculate parameters and/or weighting values for a directed acyclic graph.

The trained artificial intelligence models 254a-254n may be a directed acyclic graph with parameters and/or weighting values pre-programmed and/or pre-defined (e.g., based on self-directed learning) for detecting particular types of objects. In some embodiments, the trained artificial intelligence models 254a-254n may be a quantized neural network (e.g., a reduced size neural network configured to operate on an edge device that has been modeled based on a full size neural network that was trained offline).

While the apparatus 100 is in operation, the CNN module 150 may continually learn using new video frames as the input training data 252a-252n. However, the processors 106a-106n may be pre-trained (e.g., configured to perform computer vision before being installed in the ego vehicle 50). For example, the results of training data 252a-252n (e.g., the trained artificial intelligence models 254a-254n) may be pre-programmed and/or loaded into the processors 106a-106n. The processors 106a-106n may conduct inferences against the artificial intelligence models 254a-254n (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

The CNN module 150 may receive the training data 252a-252n in a training mode of operations. The CNN module 150 may analyze captured video frames (e.g., generated from the signals FRAMES_A-FRAMES_N) to detect objects, classify objects and/or extract data about objects using the trained artificial intelligence models 254a-254n. To perform the training and/or the computer vision operations, the CNN module 150 may generate a number of layers 260a-260n for a video frame. On each one of the layers 260a-260n, the CNN module 150 may apply a feature detection window 262. In an example, the feature detection window 262 is shown on a portion of the layer 260a. A convolution operation may be applied by the CNN module 150 on each of the layers 260a-260n using the feature detection window 262.

The convolution operation may comprise sliding the feature detection window 262 along groups of pixel data for each of the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window may slide horizontally one pixel to comprise a box of pixels B0 through E0 and B3 through E3 (e.g., the pixels from B0 through D0 and B3 through D3 are used in both the first and second operation). The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the CNN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

In the training mode of operation, training the artificial intelligence models 254a-254n may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the artificial intelligence models 254a-254n may be varied according to the design criteria of a particular implementation.

The CNN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150 to extract features from the training data 252a-252n may be varied according to the design criteria of a particular implementation.

The CNN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames during the object detection mode of operation) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by a camera (e.g., the capture device 102a and/or the lens 112a) through an inverse perspective mapping.

The CNN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

The CNN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior view use cases. The computer vision operations performed by the CNN module 150 may determine a size, shape, orientation and/or arrangement of a recognized object.

By analyzing a number of video frames in sequence, the computer vision operations performed by the CNN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150.

In some embodiments, machine learning may be performed by the centralized CNN module that has access to greater computing resources than the camera system 100. Generally, the processing capabilities and/or computing resources available to the centralized CNN module (e.g., implemented as part of a cloud computing network) may be greater than the processing capabilities and/or computing resources available to the CNN module 150 implemented by the processors 106a-106n. For example, the centralized CNN module may perform the machine learning using the training data 252a-252n, develop a machine learning model (e.g., the artificial intelligence models 254a-254n), and then provide the machine learning model to the apparatus 100. In some embodiments, the artificial intelligence models 254a-254n trained using the centralized CNN module may be quantized to be used by the CNN module 150 of the camera system 100.

Even after the artificial intelligence models 254a-254n have been trained and the CNN module 150 has been deployed, the processors 106a-106n may continue to receive the training data 252a-252n. New training data may be used to refine the machine learning model, and then provide updates to the artificial intelligence models 254a-254n. In some embodiments, the labeled training data 252a-252n used to refine the artificial intelligence models 254a-254n may be received using the communication device 110.

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module). In an example, compressing the machine learning model may comprise quantization, pruning, sparsification, etc. Compressing the machine learning model may enable the CNN module 150 to perform the machine learning and/or conduct inferences against the artificial intelligence models 254a-254n (e.g., object detection). By performing the machine learning at the edge (e.g., locally on the processors 106a-106n), there may be reduced latency compared to performing wireless communication with the centralized CNN module. Similarly, the apparatus 100 may be able to perform the machine learning without maintaining a wireless connection. By performing the machine learning at the edge, privacy may be maintained since the training data 252a-252n would be kept local. Whether the machine learning is performed locally (e.g., at the edge), performed using a centralized resource and/or performed using a combination of local and centralized resources may be varied according to the design criteria of a particular implementation.

The machine learning performed by the CNN module 150 may comprise supervised training. For example, the CNN module 150 may be self-trained using the training data 252a-252n. Supervised learning may enable the CNN module 150 to automatically adjust the weighting values in response to metadata contained within the training data 252a-252n (e.g., a designer and/or engineer may not need to program the weighting values). The metadata contained within the training data 252a-252n may provide ground truth data. Backpropogation may be implemented to compute a gradient with respect to the weighting values in response to the training data 252a-252n. For example, the training data 252a-252n may comprise the metadata labels that may enable the CNN module 150 to extract characteristics and apply the extracted characteristics to the weighting values based on the metadata labels.

In one example, where the training data 252a-252n is labeled as providing an image of a vehicle, the CNN module 150 may extract the features from the image and apply the extracted features to the weighting values to make future computer vision operations more accurately determine whether a vehicle is present. Similarly, where the training data 252a-252n is labeled as not providing an image of a vehicle, the CNN module 150 may extract the features from the image and apply the extracted features to the weighting values to make future computer vision operations more accurately determine whether a vehicle is present (e.g., particular weighting values may be decreased to de-emphasize particular features that may not be associated with a vehicle). The CNN module 150 may implement a deep convolutional neural net (DCNN) to enable features important to determining particular classes to be learned by the CNN module 150 through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Figure 4:
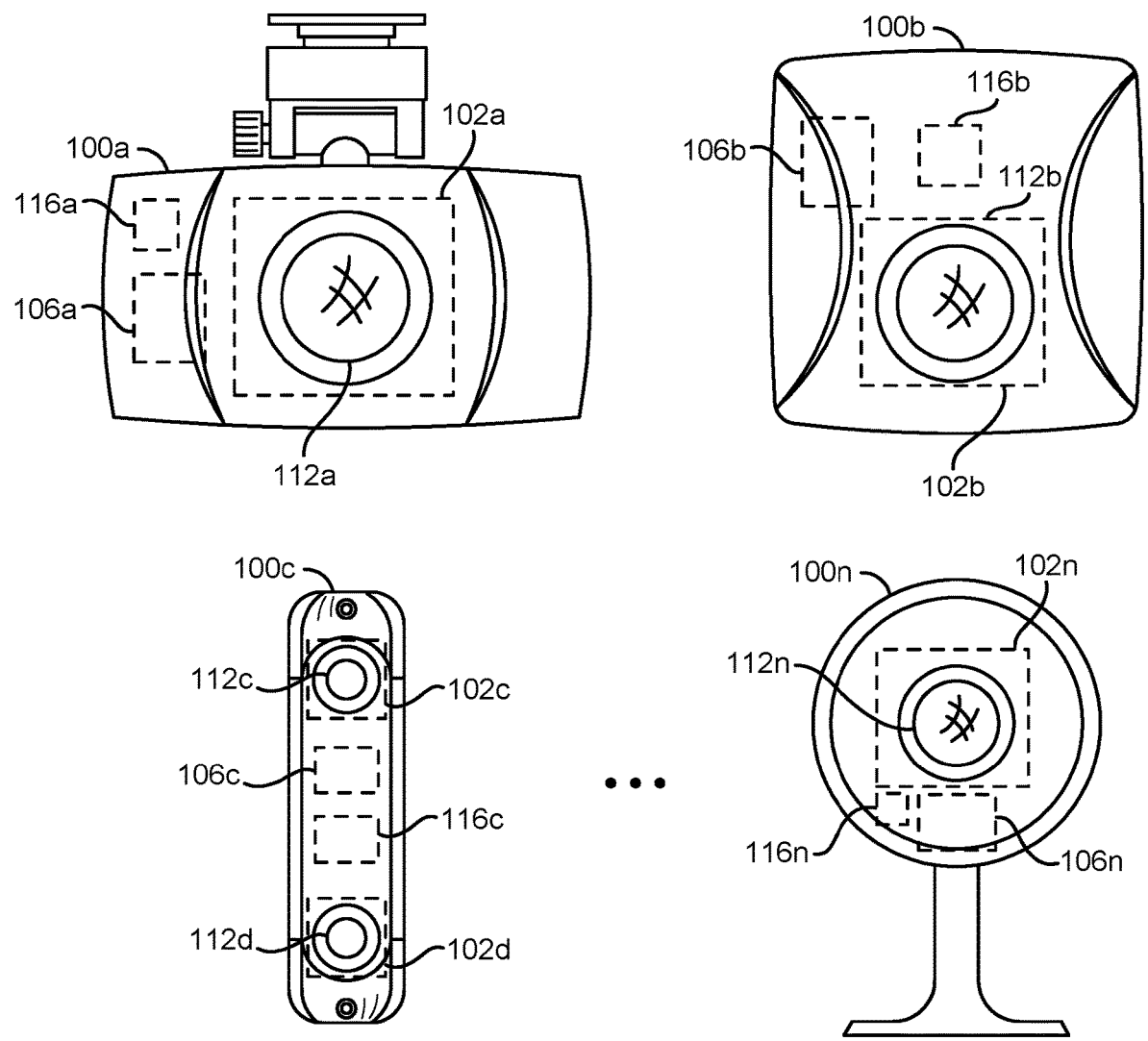
FIG. 4 is a diagram illustrating various camera systems.

Referring to FIG. 4, a diagram illustrating various camera systems is shown. Camera systems 100a-100n are shown. Each camera device 100a-100n may have a different style and/or use case. For example, the camera 100a may be an action camera, the camera 100b may be a ceiling mounted security camera, the camera 100c may be a stereo camera, the camera 100n may be a webcam or trail camera, etc. Other types of cameras may be implemented (e.g., home security cameras, battery powered cameras, doorbell cameras, etc.). The design/style of the cameras 100a-100n may be varied according to the design criteria of a particular implementation.

The camera system 100a is shown comprising the capture device 102a, the processor 106a, the lens 112a and/or the actuator 116a. The camera system 100b is shown comprising the capture device 102b, the processor 106b, the lens 112b and/or the actuator 116b. The stereo camera system 100c is shown comprising the capture devices 102c-102d, processor 106c, the lenses 112c-112d and/or the actuator 116c. The camera system 100n is shown comprising the capture device 102n, the processor 106n, the lens 112n and/or the actuator 116n. While each of the camera systems 100a-100n are shown implementing one respective processor 106a-106n and/or one respective actuator 116a-116n, the number of processors 106a-106n and/or actuators 116a-116n implemented by any of the camera systems 100a-100n may be varied according to the design criteria of a particular implementation.

The lenses 112a-112n may be configured to enable light, (e.g., the light input IM_A-IM_N) to reach the image sensors 140a-140n of the capture devices 102a-102n. The actuators 116a-116n may be configured to generate the vibration of the lenses 112a-112n at a particular frequency. The processors 106a-106n may be configured to generate image frames from pixel data FRAMES_A-FRAMES_N generated by the image sensors 140a-140n. The CNN module 150 may be configured to perform computer vision operations on the image frames to detect objects in the images frames and determine characteristics of the objects detected.

The CNN module 150 may be configured to analyze the characteristics of the objects to determine whether the objects are debris on the lenses 112a-112n (e.g., distinguish debris on the lenses 112a-112n from other objects in the video frames such as vehicles, trees, pedestrians, street signs, pets, etc.). The processors 106a-106n may be configured to present the control signal VCTRL to the actuators 116a-116n in response to detecting the debris. The particular frequency of the vibration may cause the debris to be removed from the lenses 112a-112n. While lenses 112a-112n are shown for the example camera systems 100a-100n, the vibration may also be generated for a cover (e.g., a translucent protective cover for the camera system such as a dome cover for a ceiling mounted wide-angle security camera).

The stereo camera 100c is shown comprising two capture devices 102c-102d configured to operate as a stereo pair of cameras. Each of the capture devices 102c-102d may have a respective lens 112c-112d (or cover). In the example shown, one actuator 116c may be implemented to generate the vibration to clear debris from both of the lenses 112c-112d. In another example, the stereo camera 100c may implement more than one of the actuators 116a-116n (e.g., one actuator for the lens 112c and one actuator for the lens 112d).

Figure 5:
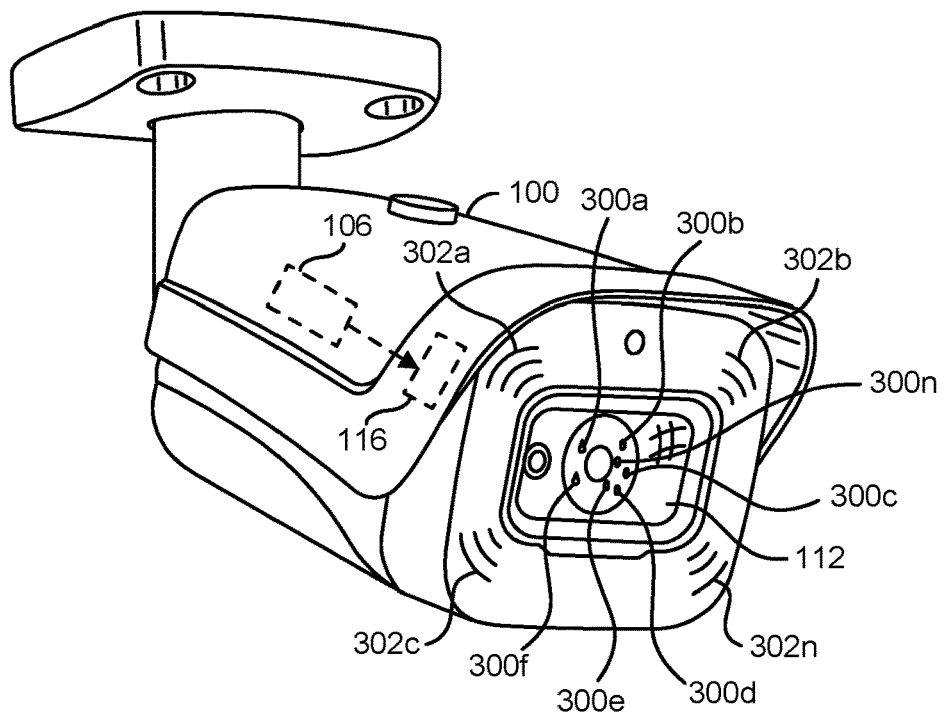
FIG. 5 is a diagram illustrating a camera system with debris on a camera lens.

Referring to FIG. 5, a diagram illustrating a camera system with debris on a camera lens is shown. The camera system 100 is shown. The camera system 100 is shown comprising the processor 106, the lens 112 and the actuator 116. In the example shown, the camera system 100 may be a ceiling mounted camera. For example, for a surveillance/security camera the lens 112 may be an external material of the camera case (e.g., a glass cover, and/or a plastic cover, such as a dome for a ceiling mounted security camera).

Debris 300a-300n is shown. The debris 300a-300n is shown attached to the lens 112. The attached debris 300a-300n may comprise particulate matter. For example, the attached debris 300a-300n may comprise water droplets (e.g., rain drops), snow, sleet, ice, dirt, mud, grime, dust, hair, fur, sand, bugs, etc. The attached debris 300a-300n may obstruct and/or obscure the image data captured by the capture device 102. The type of the attached debris 300a-300n may be varied according to the design criteria of a particular implementation.

Waved lines 302a-302n are shown. The waved lines 302a-302n may represent vibration of the lens 112. For example, the vibration 302a-302n may be generated by the actuator 116. The vibration 302a-302n may cause the lens 112 to shake at a particular frequency.

The vibration 302a-302n may comprise a consistent movement pattern. The consistent movement pattern may be predictable. The consistent movement pattern being predictable may enable effects of the vibration 302a-302n on the video frames generated to be correctable. For example, the consistent movement pattern of the vibration 302a-302n may enable the processors 106a-106n to perform electronic image stabilization of captured video frames while the lens 112 is vibrating by counteracting the consistent movement pattern.

In the example shown, the vibration 302a-302n may be performed on the lens 112. Generally, the attached debris 300a-300n may be attached to a most external element (e.g., transparent or translucent element) of the camera system 100 (e.g., a cover). For example, if the lens 112 is enclosed with the camera system behind a plastic (e.g., a protective material) cover, then the vibration 302a-302n may be performed on the most external plastic cover (e.g., the most external element). Whether the vibration 302a-302n is generated for the lens 112 or another external element may depend on which components of the apparatus 100 the actuators 116 are connected to. Whether the vibration 302a-302n is generated for the lens 112 or another external element of the camera system 100 may be varied according to the design criteria of a particular implementation.

In some embodiments, the processor 106 may be configured to perform the computer the computer vision operations on the image frames captured. The processor 106 may be configured to analyze the video frames to detect the attached debris 300a-300n on the lens 112. In response to detecting the attached debris 300a-300n, the processor 106 may generate the signal VCTRL to activate the actuator 116.

In some embodiments, the vibration 302a-302n may be generated in response to a manual input (e.g., receiving an input from an external source). For example, a person monitoring the output video frames (e.g., a security guard watching the displays 118a-118n) may see the attached debris 300a-300n on the output video frames. In one example, the person may apply the signal USER as a manual input. In another example, the person may connect to the camera system 100 (e.g., via a smartphone companion app) and communicate via the communication devices 110. Using the companion app, the person may remotely communicate the signal COM to the interface 104. The processors 106a-106n may be configured to interpret the manual input (e.g., the signal USER and/or the signal COM) and generate the signal VCTRL in response to the manual input. The signal VCTRL may be received by the actuator as an instruction to generate the vibration 302a-302n.

The actuator 116 may generate the vibration 302a-302n to clean the lens 112 by removing the attached debris 300a-300n. For example, the vibration 302a-302n may be generated similar to cleaning an image sensor of a DSLR camera.

Figure 6:
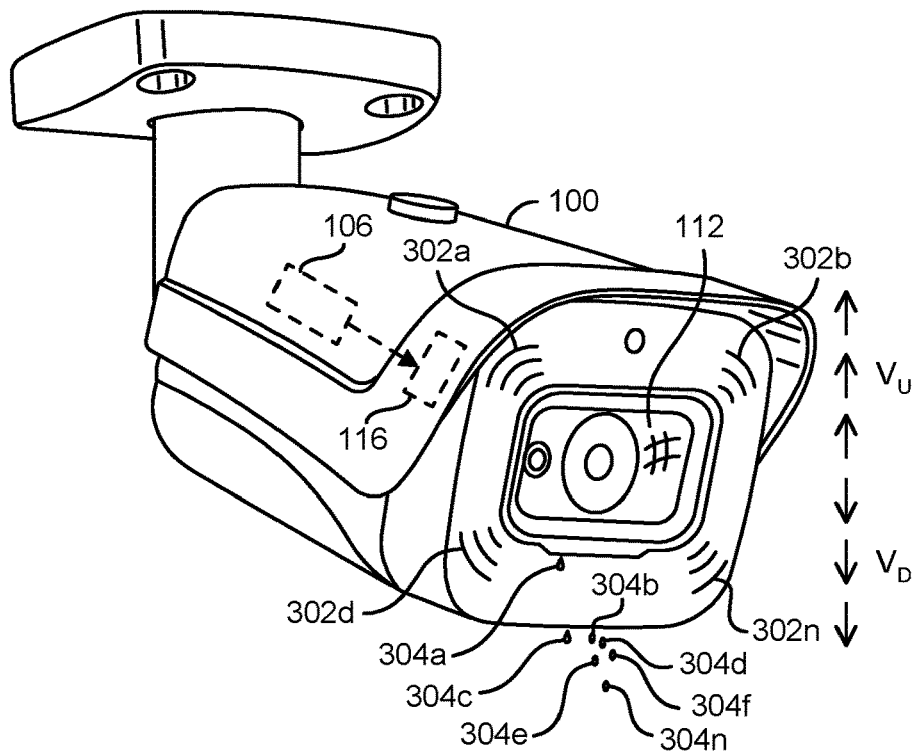
FIG. 6 is a diagram illustrating a camera system with debris being removed in response to an applied vibration.

Referring to FIG. 6, a diagram illustrating a camera system with debris being removed in response to an applied vibration is shown. The camera system 100 is shown. The camera system 100 may be the same as the camera system 100 shown in association with FIG. 5. For example, the camera system 100 may be shown in association with FIG. 6 at a later time than shown in association with FIG. 5 (e.g., FIG. 6 may represent a view of the camera system 100 at a later time than shown in FIG. 5). The camera system 100 is shown comprising the processor 106, the lens 112 and the actuator 116. The vibration 302a-302n is shown.

Debris 304a-304n is shown. The debris 304a-304n may be loosened from the lens 112. The loosened debris 304a-304n is shown falling down off the lens 112. The loosened debris 304a-304n may not be in front of (or attached to) the lens 112. The loosened debris 304a-304n may not obstruct and/or obscure the image data captured by the capture device 102.

The loosened debris 304a-304n may be the attached debris 300a-300n shown in association with FIG. 5 after the vibration 302a-302n has been applied. The vibration 302a-302n may be applied to shake the lens 112 at a particular frequency to reduce a force that attaches the attached debris 300a-300n to the surface of the lens 112. The vibration 302a-302n may be applied when the attached debris 300a-300n is detected. The attached debris 300a-300n may eventually loosen when the vibration 302a-302n sufficiently reduces an amount of force from an attachment force value that enables the attached debris 300a-300n to stick to the lens 112 to a value below the attachment force value that enables the attached debris 300a-300n to stick to the lens 112 (e.g., a threshold attachment force value).

When the attachment force drops below the threshold attachment force value, the vibration 302a-302n may eventually loosen. When the attachment force drops below the threshold attachment force value, then the attached debris 300a-300n may become the loosened debris 304a-304n. The loosened debris 304a-304n may drop down in response to the force of gravity. When gravity pulls the loosened debris 304a-304n down away from the lens 112, the debris may no longer obstruct and/or obscure the image frames generated by the processor 106.

Arrows VU and arrows VD are shown. The arrows VU may be directed in an upwards direction. The arrows VD may be directed in a downwards direction. The arrows VU and the arrows VD may represent a direction of the vibration 302a-302n. In one example, the vibration 302a-302n may be performed in one direction (e.g., along one axis). For example, the arrows VU and the arrows VD may represent applying the vibration 302a-302n in one direction along a vertical axis (e.g., perpendicular to the ground below the camera system 100). Applying the vibration 302a-302n in the direction VU and VD may enable the gravity force to drag the particles of the loosened debris 304a-304n out of the field of view of the lens 112.

Figure 7:
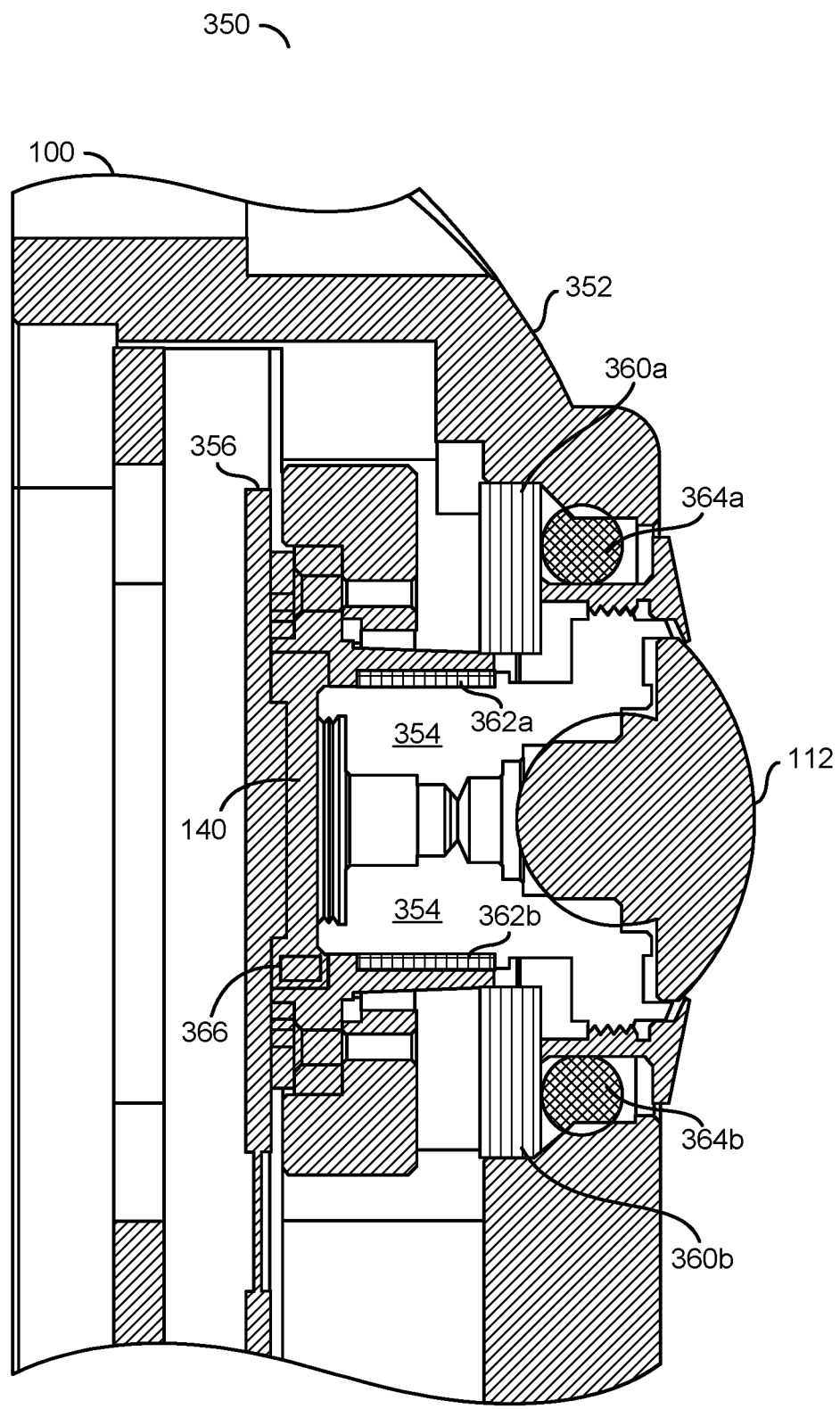
FIG. 7 is a diagram illustrating internal components of a camera system.

Referring to FIG. 7, a diagram illustrating internal components of a camera system is shown. A view 350 of the camera system 100. The view 350 may be a cross-sectional view of the camera system 100.

The camera system 100 may comprise an enclosure 352. The enclosure 352 may provide protection for the various components of the camera system 100. For example, the enclosure 352 may be a protective shell (e.g., a plastic material, a metal material, etc.). The enclosure 352 may protect the camera system 100 from impact and/or liquids. The enclosure 352 may generally block light from entering the camera system 100. In some embodiments, the enclosure 352 may be the cover vibrated by the vibration 302a-302n (e.g., the enclosure 352 may be the most external element instead of the lens 112).

The lens 112 is shown. The lens 112 may provide an opening in the enclosure 352. The lens 112 may enable focused light into the camera system 100 to be detected by the image sensor 140.

A lens barrel 354 is shown. The lens barrel 354 may direct light input from the lens 112 to the image sensor 140. The lens barrel 354 may be implemented as a tube with the lens 112 at one end and the image sensor 140 at another end.

The image sensor 140 is shown attached to a printed circuit board (PCB) 356. The PCB 356 may provide interconnections of the various electronic components of the camera system 100. For example, the processors 106a-106n, the memory 108 and/or the communication devices 110 may be interconnected using the PCB 356. In some embodiments, the PCB 356 may be the interface 104. For simplicity, various components (such as the processors 106a-106n) attached to the PCB 356 are not shown in the cross sectional view 350.

Blocks (or circuits) 360a-360b and/or blocks 362a-362b are shown. The blocks 360a-360b may implement piezoelectric components. The blocks 362a-362b may implement connectors. In one example, the piezoelectric components 360a-360b may be the actuators 116. In another example, the actuators 116 may control an activation of the piezoelectric components 360a-360b. The connectors 362a-362b may be configured to connect the lens barrel 354 to the PCB 356.

The piezoelectric components 360a-360b and the connectors 362a-362b are each shown implemented on one side of the lens barrel 354. In the example shown, the piezoelectric component 360a and the connector 362a are shown located above the lens barrel 354 and the piezoelectric component 360b and the connector 362b are shown located below the lens barrel 354. In another example, the piezoelectric components 360a-360b and the connectors 362a-362b may be located to the left and right of the lens barrel 354. The arrangement of the piezoelectric components 360a-360b and/or the connectors 362a-362b may be varied according to the design criteria of a particular implementation.

The vibration 302a-302n of the lens 112 may be generated using the piezoelectric components 360a-360b. The piezoelectric components 360a-360b may be configured to operate in antiphase to cause the vibration at a particular frequency. For example, implementing the piezoelectric components 360a-360b and/or the connectors 362a-362b on opposite sides of the lens barrel 354 may enable the antiphase operation. The signal VCTRL generated by the processors 106a-106n may cause the piezoelectric components 360a-360b to vibrate at the particular frequency.

In one example, the particular frequency may be a frequency of 30 kHz. In another example, the particular frequency may be 40 kHz. The particular frequency may be a constant frequency (e.g., a constant frequency of 30 kHz). In another example, the particular frequency may be a variable frequency (e.g., a frequency that starts at a lower value, such as 5 kHz and then ramps up over time (e.g., continuously, or in discrete steps) to a higher value, such as 60 kHz). The value of the particular frequency may be varied according to the design criteria of a particular implementation.

The connectors 362a-362b may be implemented as bendable (or flexible) cylindrical elements. The connectors 362a-362b may be configured to connect the lens barrel 354 to the PCB 356. The connectors 362a-362b may be configured to respond to the movement caused by the piezoelectric components 360a-360b. The movement of the piezoelectric components 360a-360b may be transferred through the connectors 362a-362b. The connectors 362a-362b may cause the lens barrel 354 to vibrate, which may result in the vibration of the lens 112. In one example, the connectors 362a-362b may be implemented as a rubber material. In another example, the connectors 362a-362b may be implemented as a plastic material. The type, size, shape and/or material used for the connectors 362a-362b may be varied according to the design criteria of a particular implementation.

In some embodiments, the connectors 362a-362b may be configured to translate and/or transfer the vibration generated by the piezoelectric components 360a-360b to the lens barrel 354. The connectors 362a-362b may be further configured to dampen the vibration transferred to the image sensor 140. For example, stabilizing the image sensor 140 may prevent and/or limit an amount of distortion in the output images caused by the vibration 302a-302n. The method of stabilizing the image sensor 140 may be varied according to the design criteria of a particular implementation.

Components 364a-364b are shown. The components 364a-364b may implement sealing elements. In one example, the sealing elements 364a-364b may comprise O-rings. The sealing elements 364a-364b may prevent water and/or other liquids from entering the enclosure 352. The sealing elements 364a-364b may be configured to provide water proof and/or water resistant characteristics to the camera system 100. For example, if the loosened debris 304a-304n is rain drops, the sealing elements 364a-364b may prevent the loosened debris 304a-304n from entering the enclosure 352 when the vibration 302a-302n removes the loosened debris 304a-304n from the lens 112. The sealing elements 364a-364b may maintain waterproof operation of the camera system 100 even during the vibration of the lens 112.

In the example shown, the sealing element 364a is shown located above the lens 112 and the sealing element 364b is shown located below the lens 112. In another example, the sealing elements 364a-364b may be located to the left and right of the lens 112. Generally, the sealing elements 364a-364b may be located at any place of the enclosure 352 that may allow water in (e.g., seams, where two pieces connect together, input/output ports, around the lens 112, etc.). The sealing elements 364a-364b may be implemented using a sealing material (e.g., rubber, silicone, fiber, etc.). The size, shape, location and/or material used for implementing the sealing elements 364a-364b may be varied according to the design criteria of a particular implementation.

The image sensor 140 is shown comprising a block (or circuit) 366. The circuit 366 may implement an actuator. The actuator 366 may be configured to perform a stabilization of the image sensor 140. In an example, the actuator 366 may be configured to perform a five axes actuation. The actuator 366 may enable image stabilization. For example, the image stabilization performed by the actuator 366 may counteract the vibration 302a-302n caused by the piezoelectric components 360a-360b.

Figure 8:
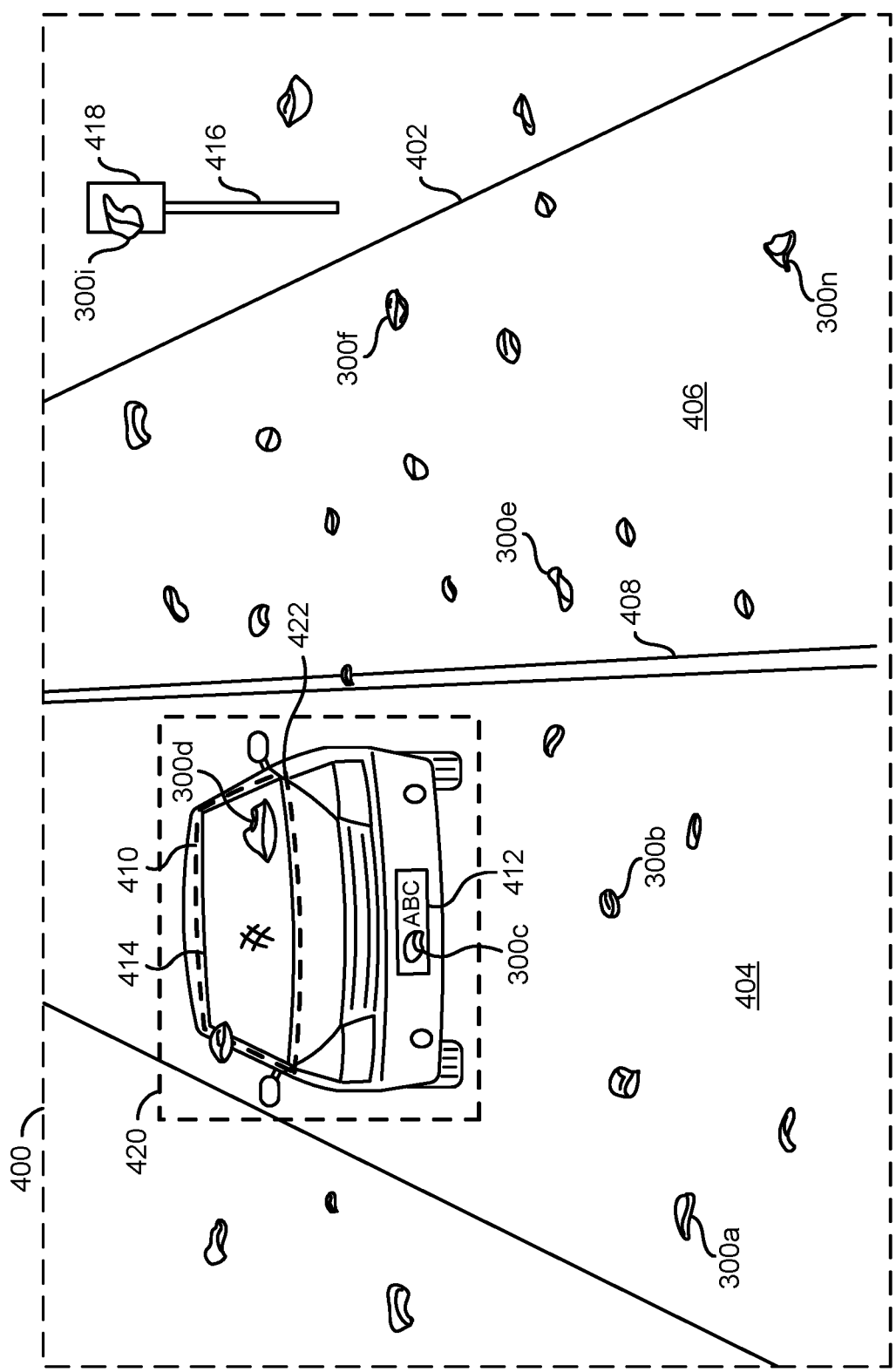
FIG. 8 is a diagram illustrating a captured image with debris obstructing the captured image.

Referring to FIG. 8, a diagram illustrating a captured image with debris obstructing the captured image is shown. An example video frame 400 is shown. The example video frame 400 may comprise pixel data captured by one or more of the capture devices 102a-102n. In one example, the video frame 400 may be provided to the processor 106a-106n as the signal FRAMES_A-FRAMES_N. In another example, the video frame 400 may be generated by the processors 106a-106n in response to the pixel data provided in the signal FRAMES_A-FRAMES_N. The pixel data may be received by the processors 106a-106n and video processing operations may be performed by the video processing pipeline 156 to generate the example video frame 400. In some embodiments, the example video frame 400 may be presented as human viewable video output to one or more of the displays 118a-118n. In some embodiments, the example video frame 400 may be utilized internal to the processor 106a-106n to perform the computer vision operations.

The example video frame 400 may comprise a view of a roadway 402. In an example, the example video frame 400 may be captured by one of the capture devices 102a-102n mounted to the ego vehicle 50 (e.g., a rear-mounted camera, a camera mounted on the front of the ego vehicle 50, etc.). The roadway 402 may comprise a lane 404 and a lane 406. A lane line 408 may separate the lane 404 and the lane 406. A vehicle 410 is shown in the lane 404. For example, the vehicle 410 may be approaching the ego vehicle 50 in the opposite lane (e.g., the ego vehicle 50 may be traveling in the lane 406).

The oncoming vehicle 410 may comprise a license plate 412 and a windshield 414. A signpost 416 is shown beside the lane 406. The signpost 416 may hold up a sign 418. For example, the sign 418 may provide a speed limit, a road shape warning, a construction warning, etc.

The attached debris 300a-300n is shown in the example video frame 400. In the example shown, the attached debris 300a-300n may comprise rain drops. The rain drops 300a-300n may be attached to the lens 112. Since the rain drops 300a-300n may be attached to the lens 112, the rain drops 300a-300n may appear regardless of whether the capture devices 102a-102n zooms, pans, tilts, changes direction, etc.

The rain drops 300a-300n attached to the lens 112 may cover other objects and/or details captured in the example video frame 400. For example, regardless of what appears beyond the rain drops 300a-300n, the rain drops 300a-300n may appear in front. The rain drops 300a-300n may partially and/or totally obscure content in the example video frame 400. For example, the rain drops 300a-300n may act as a filter effect overlaid on top of anything captured in the video data.

The rain drops 300a-300n may be undesired content captured. In the example shown, the roadway 402, the vehicle 410, the license plate 412, the signpost 416 and/or the sign 418 may be desired content captured. The undesired debris 300a-300n may potentially cover the desired video content. For example, the rain drop 300c may partially cover the license plate 412 and the rain drop 300i may partially cover the sign 418.

A dotted shape 420 and a dotted shape 422 are shown. The dotted shape 420 and the dotted shape 422 may represent the detection of objects by the computer vision operations performed by the processors 106a-106n. The dotted shape 420 and the dotted shape 422 may comprise the pixel data corresponding to an object detected by the computer vision operations pipeline 162 and/or the CNN module 150. The dotted shape 420 and the dotted shape 422 are shown for illustrative purposes. In an example, the dotted shape 420 and the dotted shape 422 may be a visual representation of the object detection (e.g., the dotted shapes 420-422 may not appear on an output video frame displayed on one of the displays 118a-118n). In another example, the dotted shapes 420-422 may be a bounding box generated by the processors 106a-106n displayed on the video frame to indicate that an object has been detected (e.g., the bounding boxes 420-422 may be displayed in a debug mode of operation). In the example shown, two objects are shown detected for simplicity. In another example, the number of objects detected may be limited, due to the rain drops 300a-300n obscuring the desired content in the video frame 400. The number and/or types of objects detected by the processors 106a-106n may be varied according to the design criteria of a particular implementation.

The object 420 detected may be the vehicle 410. The object 422 detected may be the windshield 414. The computer vision operations may be configured to detect characteristics of the detected objects. In the example video frame 400, characteristics of the objects 420-422 (e.g., a color of the vehicle 410, a type of the vehicle 410 (e.g., a van, a sedan, a truck, etc.), a distance from the ego vehicle 50, a speed of the vehicle 410 relative to the ego vehicle 50, etc.) may be detected by the processors 106a-106n. The types of characteristics detected may be varied according to the design criteria of a particular implementation.

The attached debris 300a-300n may disrupt the detection of various objects in the example video frame 400. In the example shown, the vehicle 410 is shown detected as the detected object 420 and the windshield 414 is shown detected as the detected object 422. However, other desired objects may not be detected. In the example shown, the rain drop 300c is located over the license plate 412. The rain drop 300c may prevent the license plate 412 from being detected by the CNN module 150. Similarly, the rain drop 300i is located over the sign 418. The rain drop 300i may prevent the signpost 416 and the sign 418 from being detected by the CNN module 150.

The vehicle 410 may be detected as the detected object 420 despite the presence of the rain drops 300a-300n. The vehicle 410 may be an object that is large enough to still be distinguished even with the presence of the attached debris 300a-300n. Similarly, the road 402 may be detected since the road 402 is relatively large compared to the size of the attached debris 300a-300n. The windshield 414 may be detected as the detected object 422 since the windshield is relatively large, while the license plate 412 may not be able to be detected because of a relatively smaller size. The amount, size and/or density of the attached debris 300a-300n may result in various objects being able or unable to be detected by the CNN module 150. For example, even a larger object such as the vehicle 410 may be prevented from being detected if the attached debris 300a-300n creates enough discontinuities, and/or blocks too many identifiable features.

The attached debris 300a-300n may disrupt the detection of various characteristics of the detected objects 420-422 in the example video frame 400. For example, even if the CNN module 150 is capable of detecting objects despite the presence of the attached debris 300a-300n, the attached debris 300a-300n may still limit the amount of information that may be extracted about the detected objects 420-422. In the example shown, the windshield 414 may be detected as the detected object 422 despite the rain drop 300d located over the windshield 414 in the example video frame 400. However, one characteristic detected about the windshield 414 may be the presence and/or number of occupants within the vehicle 410. For example, the processors 106a-106n may detect people within the vehicle 410 to shape the headlight beams to prevent shining headlights at occupants in other vehicles. The rain drop 300d may disrupt the detection of the number of occupants within the vehicle 410. Similarly, even if the CNN module 150 was able to detect the license plate 412, the rain drop 300c may prevent reading of the entire license plate number. In another example, the CNN module 150 may be able to detect the road 402, however the rain drops 300a-300n may cause a discontinuity in the lane line 408, which may disrupt the detection of the lane 404 and the lane 406 (which may prevent proper lane detection and/or lane keeping functions for autonomous driving and/or driver assistance).

The processors 106a-106n may be configured to detect the presence of the attached debris 300a-300n. In one example, the processors 106a-106n may perform the object detection to detect whether there is attached debris 300a-300n the lens 112. The CNN module 150 may be configured to distinguish between objects located in the foreground and objects located in the background. The attached debris 300a-300n may appear as a foreground object. In some embodiments, the processors 106a-106n may be configured to perform depth analysis. Generally, desired objects may be detected at a distance away from the lens 112. In some embodiments, where the camera system 100 comprises a stereo camera, the attached debris 300a-300n may not appear with the same pattern and/or arrangement on each stereo pair of images captured (e.g., the location of the rain drops 300a-300n may be random and both lenses would likely not have rain drops located at the same positions, which may indicate the presence of the attached debris 300a-300n).

In some embodiments, the CNN module 150 may determine whether the attached debris 300a-300n obscures and/or distorts the desired objects in the example video frame 400. The type of distortion may indicate the presence of the attached debris 300a-300n. In some embodiments, the CNN module 150 may be configured to track the location of the objects detected over time (e.g., from video frame to video frame over a sequence of captured video frames). The attached debris 300a-300n may generally remain in a static position as the capture device 102 moves (e.g., when the ego vehicle 50 turns). The attached debris 300a-300n may generally remain in a static position as other objects in the example video frame 400 move (e.g., the vehicle 410 may move close to the ego vehicle 50, resulting in a change in size, or turn, resulting in a change of position, etc.). The lack of movement of an object over time may indicate that the object is the attached debris 300a-300n. The methods for detecting the presence of the attached debris 300a-300n using computer vision operations may be varied according to the design criteria of a particular implementation.

Each method for detecting the attached debris 300a-300n may increase or decrease of a likelihood of the decision module 158 determining that the attached debris 300a-300n is present. For example, the more indications that attached debris 300a-300n is present may increase a confidence level of the detection of the attached debris 300a-300n. For example, the detection of objects that do not move relative to the movement of the camera and objects that cause a distortion effect on other objects may have a higher confidence level for detecting the attached debris 300a-300n than only detecting an object that does not move relative to the movement of the camera. When the confidence level of the presence of the attached debris 300a-300n is greater than a pre-determined threshold, then the processors 106a-106n may generate the signal VCTRL to activate the vibration 302a-302n of the lens 112.

The amount of the attached debris 300a-300n detected may further be analyzed by the decision module 158 to determine whether to generate the signal VCTRL. For example, a single rain drop may not be a sufficient amount of the attached debris 300a-300n to generate the signal VCTRL (e.g., one rain drop may not disrupt the detection of objects). The decision module 158 may activate the vibration after a pre-determined threshold for an amount of the attached debris 300a-300n has been detected. The pre-determined threshold may comprise a size of the attached debris 300a-300n, a density of the attached debris 300a-300n, how much of the example video frame 400 is obscured, where the attached debris 300a-300n is located (e.g., vibration may be activated when the attached debris 300a-300n is centrally located in the example video frame 400 but may not be activated when the attached debris 300a-300n is only located towards the outer edges of the example video frame 400).

Figure 9:
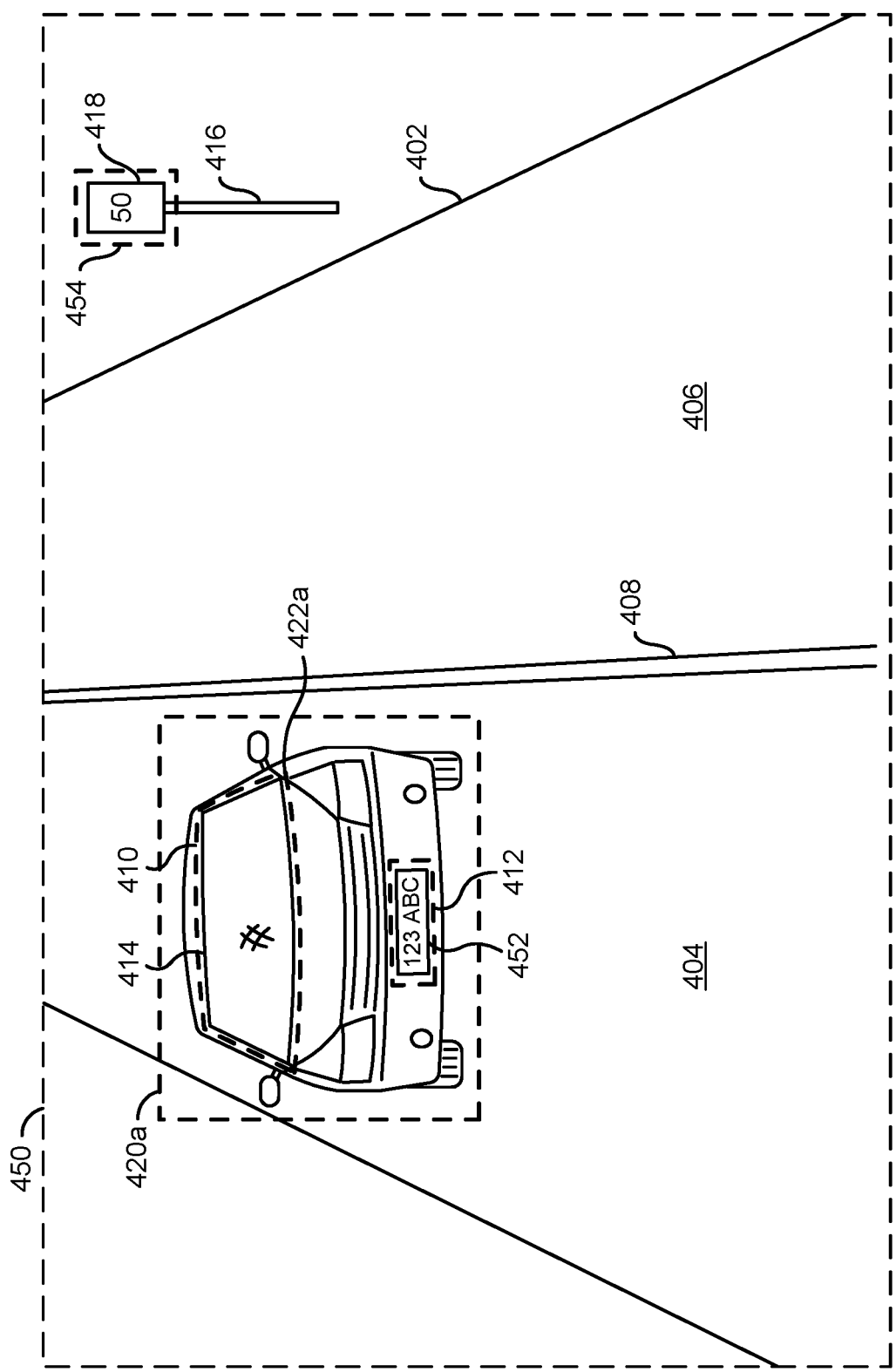
FIG. 9 is a diagram illustrating a captured image with debris removed.

Referring to FIG. 9, a diagram illustrating a captured image with debris removed is shown. An example video frame 450 is shown. The example video frame 450 may be generated similar to the example video frame 400 shown in association with FIG. 8. For example, the example video frame 450 may be a video frame generated by the processors 106a-106n at a time later than the generation of the video frame 400 shown in association with FIG. 8. For example, attached debris 300a-300n may have been detected on the example video frame 400 and the processors 106a-106n may have generated the signal VCTRL to initiate the vibration 302a-302n. The example video frame 450 may be a video frame generated after a cleaning cycle has been completed and/or during a cleaning cycle. A cleaning cycle may comprise an amount of time that the vibration 302a-302n is active (e.g., from when the vibration 302a-302n is initiated until the vibration 302a-302n is stopped).

In the example video frame 450, the attached debris 300a-300n may no longer be present. The vibration 302a-302n may have caused the attached debris 300a-300n to detach from the lens 112 and fall away off the lens 112 (e.g., become the loosened debris 304a-304n shown in association with FIG. 6). The processors 106a-106n may continually perform the computer vision operations on each video frame generated. The removal of the attached debris 300a-300n may enable the CNN module 150 to detect objects that would have otherwise been obscured by the attached debris 300a-300n.

The example video frame 450 may comprise the roadway 402. The lane 404 and the lane 406 are shown separated by the lane line 408 on the roadway 402. The vehicle 410 is shown in the lane 404. The signpost 416 and the sign 418 are shown beside the roadway 402.

The detected objects 420a-422a are shown. The detected object 420a may be the vehicle 410. The detected object 422a may be the windshield 414. The detected objects 420a-422a may be the same detected objects 420-422 that the CNN module 150 was capable of detecting in the earlier example video frame 400 with the attached debris 300a-300n present.

With the attached debris 300a-300n removed from the lens 112, the CNN module 150 may be able to detect more objects than the detected objects 420a-422a. Dotted boxes 452-454 are shown. The dotted boxes 452-454 may be similar illustrative examples of object detection as the dotted boxes 420-422 as shown in association with FIG. 8. The dotted boxes 452-454 may represent objects detected by the CNN module 150 after the attached debris 300a-300n was removed that was not detected before the attached debris 300a-300n was removed.

The detected object 452 may be the license plate 412. The detected object 454 may be the sign 418. For example, the processors 106a-106n may be configured to perform OCR operations to read text. The processors 106a-106n may perform the OCR operations on the license plate 412 to read the license plate number. The processors 106a-106n may perform the OCR operations on the sign 418 to interpret the sign 418. For example, a speed limit of 50 is shown. The speed limit read from the detected object 454 may be used by various vehicle systems for autonomous driving (e.g., the ego vehicle 50 may not exceed the speed limit of the sign 418).

With the attached debris 300a-300n removed from the lens 112, the CNN module 150 may be able to detect characteristics that may have been obscured by the attached debris 300a-300n. In the example shown, with the attached debris 300a-300n removed, the windshield 414 is not obscured by raindrops. With a clear view of the windshield 414, the processors 106a-106n may be capable of determining the number and/or location of occupants within the vehicle 410. The processors 106a-106n may be further configured to correct errors made in detecting objects and/or extracting data about characteristics of the detected objects 420a-422a that were made as a result of the distortion caused by the attached debris 300a-300n. For example, an OCR result of reading the license plate 412 may be corrected if one of the rain drops 300a-300n was blocking one or more characters of the license plate 412.

In some embodiments, the video processing pipeline 156 may be configured to perform image stabilization. The vibration 302a-302n implemented to clean the attached debris 300a-300n may cause a distortion of the output video frames. The vibration 302a-302n may be performed at the particular frequency (e.g., 30 kHz). Since the vibration frequency and/or the direction of the vibration (e.g., VU and VD) may be known in advance, the image stabilization performed by the video processing pipeline 156 may be configured to counteract distortion caused by the vibration 302a-302n. The image stabilization may enable the video frame 450 to be output while the vibration 302a-302n is active. For example, distortion caused by the vibration 302a-302n may be temporary and correctable using video processing techniques such as image stabilization, while distortion caused by the attached debris 300a-300n may not be correctable using video processing techniques.

Figure 10:
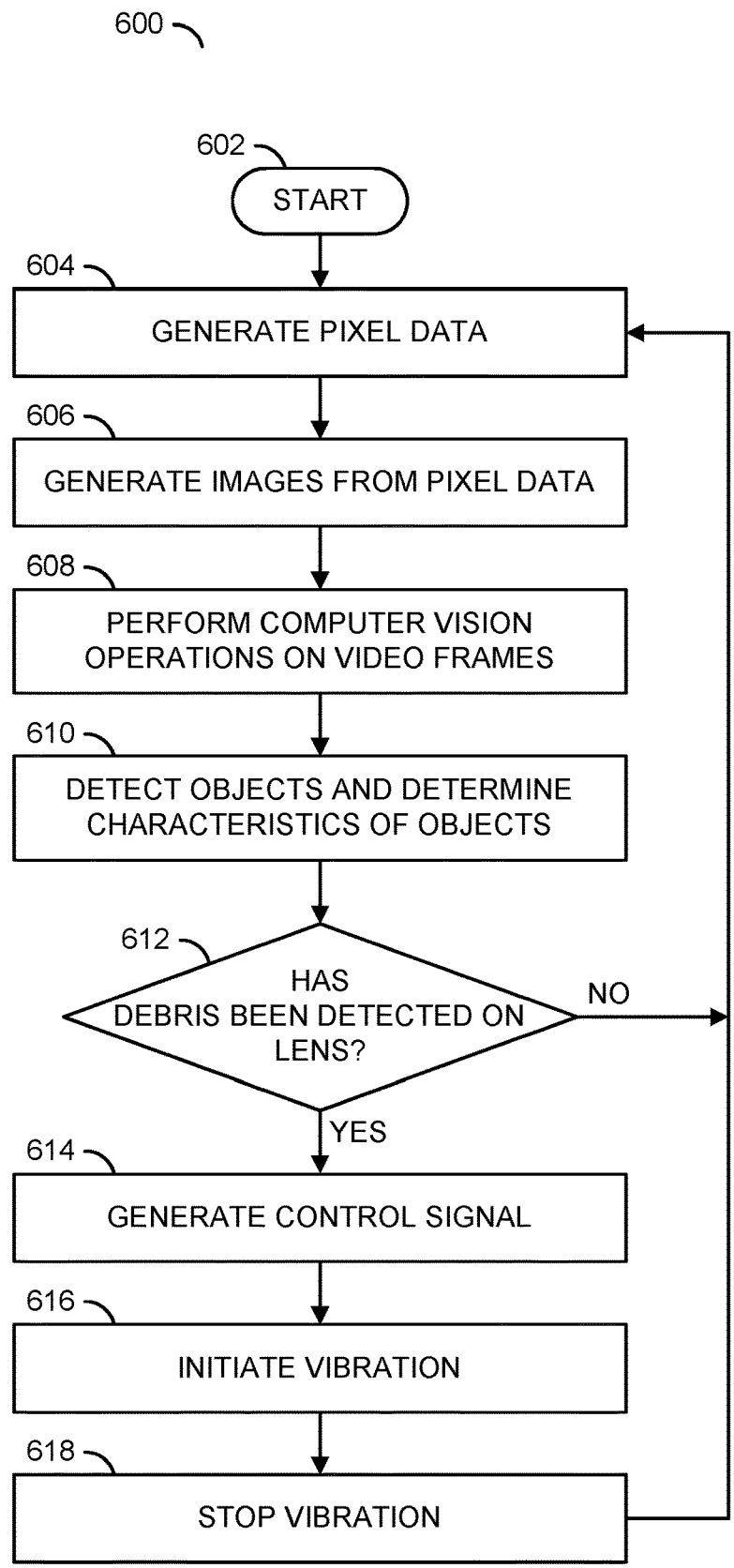
FIG. 10 is a flow diagram illustrating a method for removing debris from a camera.

Referring to FIG. 10, a method (or process) 600 is shown. The method 600 may remove debris from a camera. The method 600 generally comprises a step (or state) 602, a step (or state) 604, a step (or state) 606, a step (or state) 608, a step (or state) 610, a decision step (or state) 612, a step (or state) 614, a step (or state) 616, and a step (or state) 618.

The step 602 may start the method 600. In the step 604, the processors 106a-106n may generate and/or receive pixel data. One or more of the capture devices 102a-102n may present the signals FRAMES_A-FRAMES_N to the processors 106a-106n. Next, in the step 606, the processors 106a-106n may generate video frames from the pixel data. For example, one or more of the dedicated hardware modules 180a-180n and/or the video processing pipeline 156 may generate video frames from the signals FRAMES_A-FRAMES_N. Next, the method 600 may move to the step 608.

In the step 608, the processors 106a-106n may perform computer vision operations on the video frames. In an example, the video processing pipeline 156 may present the video frames to the CNN module 150 as the video frames are generated to enable real-time computer vision operations. Next, in the step 610, the CNN module 150 may perform object detection and/or determine the characteristics of the objects detected. The object detection, along with classification and/or segmentation may be part of the computer vision operations performed by the CNN module 150. Next, the method 600 may move to the decision step 612.

In the decision step 612, the decision module 158 may determine whether the attached debris 300a-300n has been detected on the lens 112 (or a cover for the capture device 102). The attached debris 300a-300n may be detected using the computer vision operations (e.g., classifying the detected objects as debris). In some embodiments, a threshold amount of the attached debris 300a-300n may be used to determine whether the attached debris 300a-300n is considered to be present (e.g., a number of droplets, a percentage of the field of view being obscured, a percentage of a region of the field of view being obscured, etc.). If the attached debris 300a-300n has not been detected, then the method 600 may return to the step 604. If the attached debris 300a-300n has been detected, then the method 600 may move to the step 614.

In the step 614, the processors 106a-106n may generate the control signal VCTRL. The control signal VCTRL may be presented to the actuators 116. In an example, the actuators 116 may be the piezoelectric components 360a-360b. Next, in the step 616, the piezoelectric components 360a-360b may initiate the vibration 302a-302n. The vibration 302a-302n may be performed at a particular frequency (e.g., 30 kHz). In the step 618, the piezoelectric components 360a-360b may stop the vibration 302a-302n. Next, the method 600 may return to the step 604.

In the method 600, the steps 602-618 may be shown as sequential steps. However, the steps 602-618 may be performed in parallel and/or substantially in parallel. For example, if electronic image stabilization is performed to correct the video frames in response to the vibration 302a-302n, the pixel data and video frames may be generated during the cleaning cycle. Similarly, pixel data and/or computer vision operations may be performed while the vibration 302a-302n is active.

Figure 11:
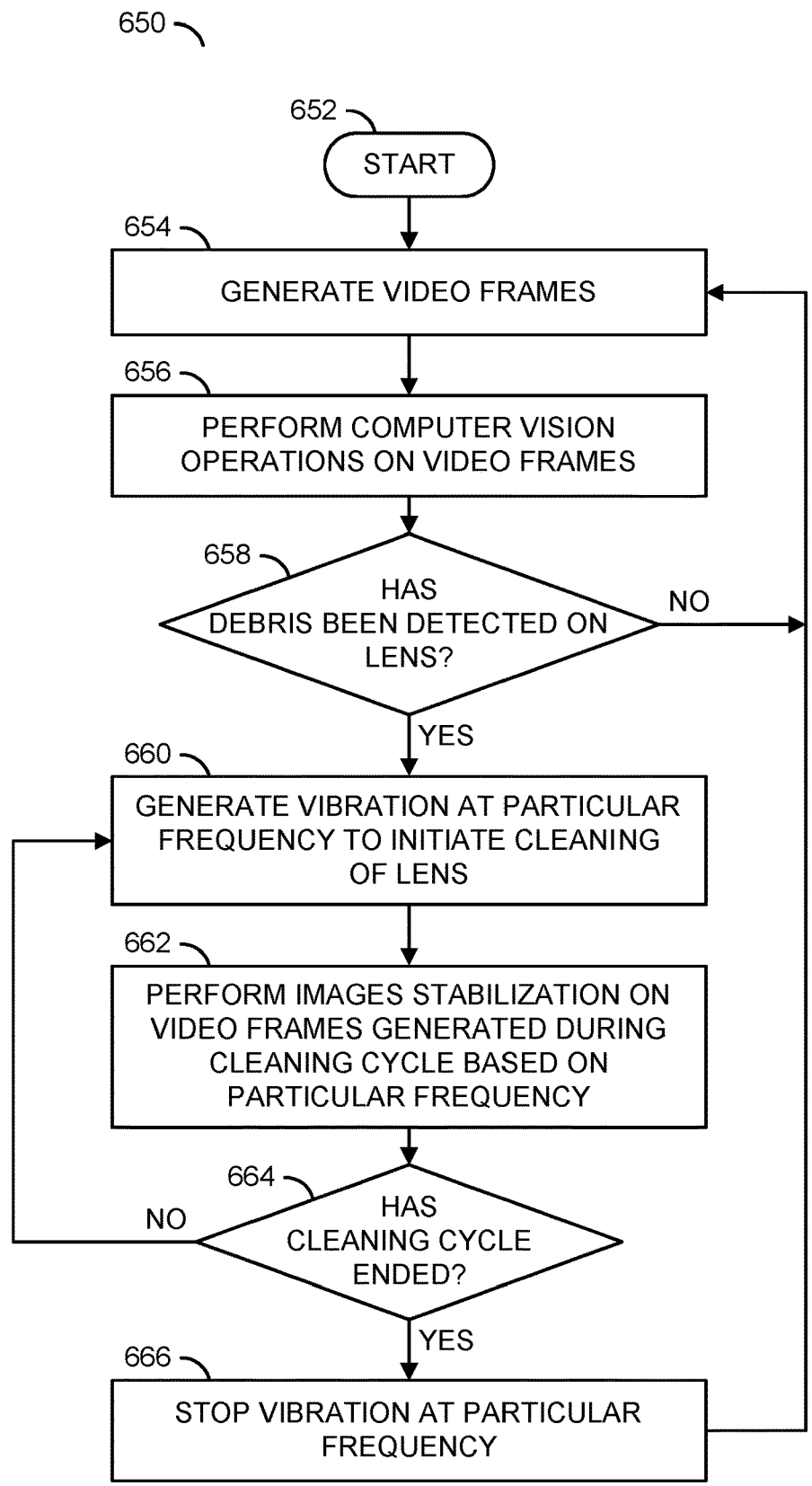
FIG. 11 is a flow diagram illustrating a method for performing image stabilization in response to a particular vibration of a cleaning system.

Referring to FIG. 11, a method (or process) 650 is shown. The method 650 may perform image stabilization in response to a particular vibration of a cleaning system. The method 650 generally comprises a step (or state) 652, a step (or state) 654, a step (or state) 656, a decision step (or state) 658, a step (or state) 660, a step (or state) 662, a decision step (or state) 664, and a step (or state) 666.

The step 652 may start the method 650. In the step 654, the processors 106a-106n may generate the video frames. Next, in the step 656, the CNN module 150 may perform the computer vision operations on the video frames. Next, the method 650 may move to the decision step 658.

In the decision step 658, the decision module 158 may determine whether the attached debris 300a-300n has been detected on the camera lens 112. In one example, the computer vision operations may detect and/or classify objects as the attached debris 300a-300n. If the attached debris 300a-300n has not been detected, then the method 650 may return to the step 654. If the attached debris 300a-300n has been detected, then the method 650 may move to the step 660.

In the step 660, the piezoelectric components 360a-360b may generate the vibration 302a-302n at a particular frequency to initiate the cleaning of the lens 112. Next, in the step 662, the processors 106a-106n may perform image stabilization on the video frames generated during the cleaning cycle. In one example, the image stabilization may comprise an electronic image stabilization by counteracting the shaking of the captured images based on the particular frequency of the vibration 302a-302n. In another example, the image stabilization may be performed by the actuator 366. Next, the method 650 may move to the decision step 664.

In the decision step 664, the processors 106a-106n may determine whether the cleaning cycle has ended. The starting and then stopping of the vibration 302a-302n may be a cleaning cycle. In one example, the cleaning cycle may be timed (e.g., the vibration 302a-302n may last for 5 seconds, 10 seconds, 30 seconds, etc.). In another example, the cleaning cycle may be performed as long as the attached debris 300a-300n is detected (e.g., the computer vision operations may be performed continuously while the vibration 302a-302n is performed and if the attached debris 300a-300n is unable to be removed a notification may be sent to the driver 202 and/or another user).

In the decision step 664, if the cleaning cycle has not ended, then the method 650 may return to the step 660. If the cleaning cycle has ended, then the method 650 may move to the step 666. In the step 666, the vibration 302a-302n at the particular frequency may be stopped. In one example, the processors 106a-106n may send the signal VCTRL to stop the piezoelectric components 360a-360b. In another example, the piezoelectric components 360a-360b may stop vibrating after a pre-determined amount of time. Next, the method 650 may return to the step 654.

In the example method 650, the video frames may continue to be captured during the cleaning cycle. For example, while the steps 660-666 may appear sequentially after the steps 654-658, all of the steps 652-666 may be performed in parallel and/or substantially in parallel. For example, while the image stabilization is implemented, the camera system 100 may continue to generate the video frames while the vibration 302a-302n is active.

Figure 12:
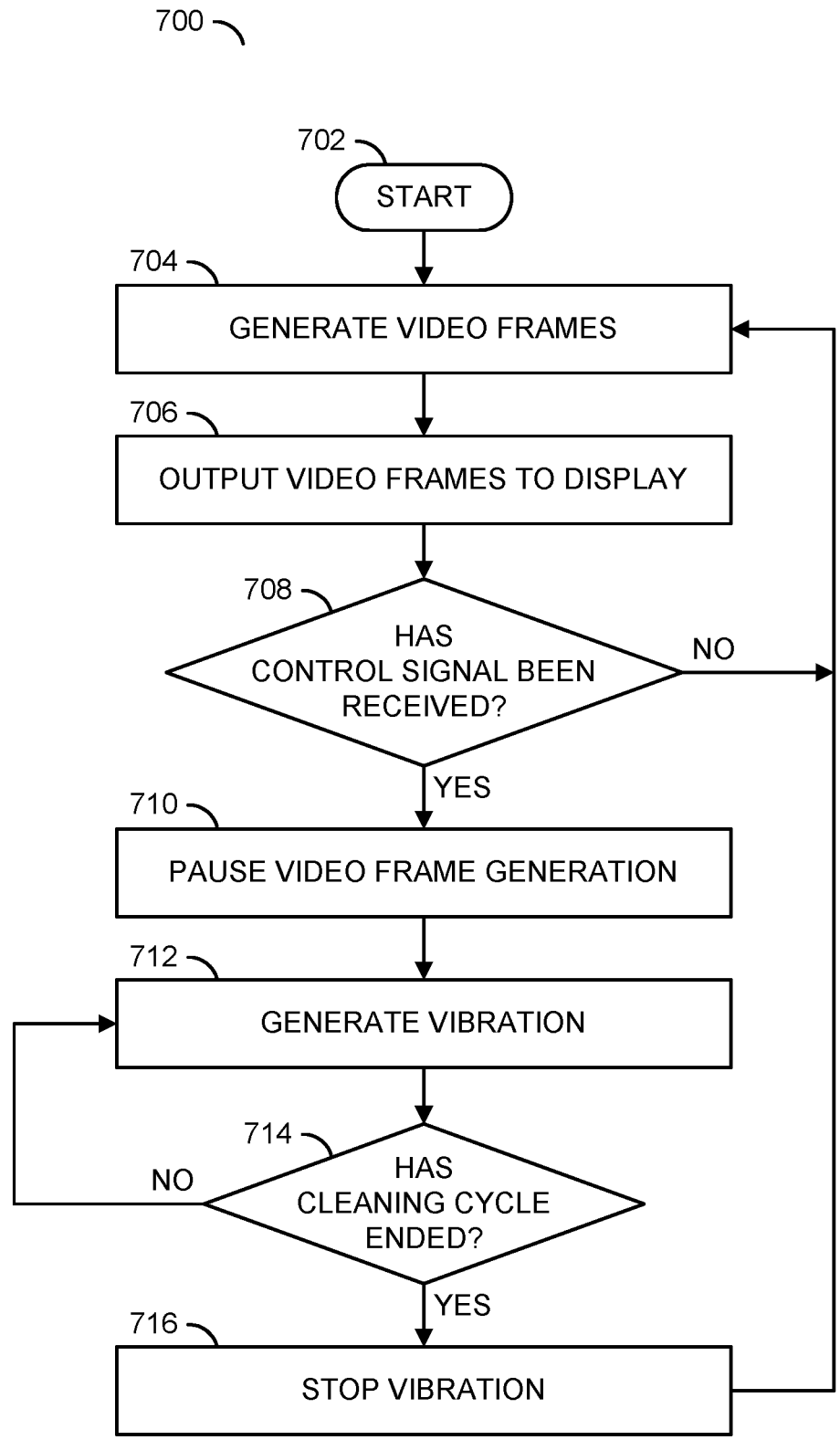
FIG. 12 is a flow diagram illustrating a method for pausing video capture during vibration caused by a cleaning system.

Referring to FIG. 12, a method (or process) 700 is shown. The method 700 may pause video capture during vibration caused by a cleaning system. The method 700 generally comprises a step (or state) 702, a step (or state) 704, a step (or state) 706, a decision step (or state) 708, a step (or state) 710, a step (or state) 712, a decision step (or state) 714, and a step (or state) 716.

The step 702 may start the method 700. In the step 704, the processors 106a-106n may generate the video frames. Next, in the step 706, the processors 106a-106n may present the video frames to one or more of the displays 118a-118n. For example, the processors 106a-106n may generate the output signals VOUT_A-VOUT_N as an input to the displays 118a-118n. The video output signals VOUT_A-VOUT_N may be presented to the displays 118a-118n with or without performing computer vision operations. Next, the method 700 may move to the decision step 708.

In the decision step 708, the processors 106a-106n may determine whether a control signal has been received. In one example, the control signal may be a user-provided signal (e.g., the signal USER presented to the interface 104, in response to a person pressing a button). In another example, the control signal may be a wirelessly communicated signal (e.g., the signal COM received by the communication devices 110 in response to a user providing an input using a remote device such as a smartphone running an app that controls the camera system 100 and/or using a video surveillance station). If the control signal has not been received, then the method 700 may return to the step 704. If the control signal has been received, then the method 700 may move to the step 710.

In the step 710, the processors 106a-106n may pause generation of the video frames. For example, the video processing pipeline 156 may not generate the video frames in response to the pixel data. Next, in the step 712, the processors 106a-106n may generate the control signal VCTRL to generate the vibration 302a-302n. Next, the method 700 may move to the decision step 714.

In the decision step 714, the processors 106a-106n may determine whether the cleaning cycle has ended. In one example, the cleaning cycle may have a time limit. In another example, the cleaning cycle may be ended manually (e.g., using the signal USER and/or the signal COM provided by a user). If the cleaning cycle has not ended, then the method 700 may return to the step 712. If the cleaning cycle has ended, then the method 700 may move to the step 716. In the step 716, the processors 106a-106n may stop the vibration 302a-302n. Next, the method 700 may return to the step 704 (e.g., resume generating image frames and/or video frames).

The method 700 may be an example scenario when the camera system 100 is implemented without computer vision implemented to detect the attached debris 300a-300n. A manual input may activate/deactivate the vibration 302a-302n. The method 700 may be an example scenario when the camera system 100 does not perform image stabilization to counteract the vibration 302a-302n. The video frames may not be generated during the cleaning cycle and the generation of the video frames may be reactivated after the cleaning cycle has been completed. In some embodiments, the output video VOUT_A-VOUT_N may still be generated during the cleaning cycle (e.g., vibration may be seen on the output video frames on the displays 118a-118n). Whether the video frame generation is paused may be a user-selectable preference.

Figure 13:
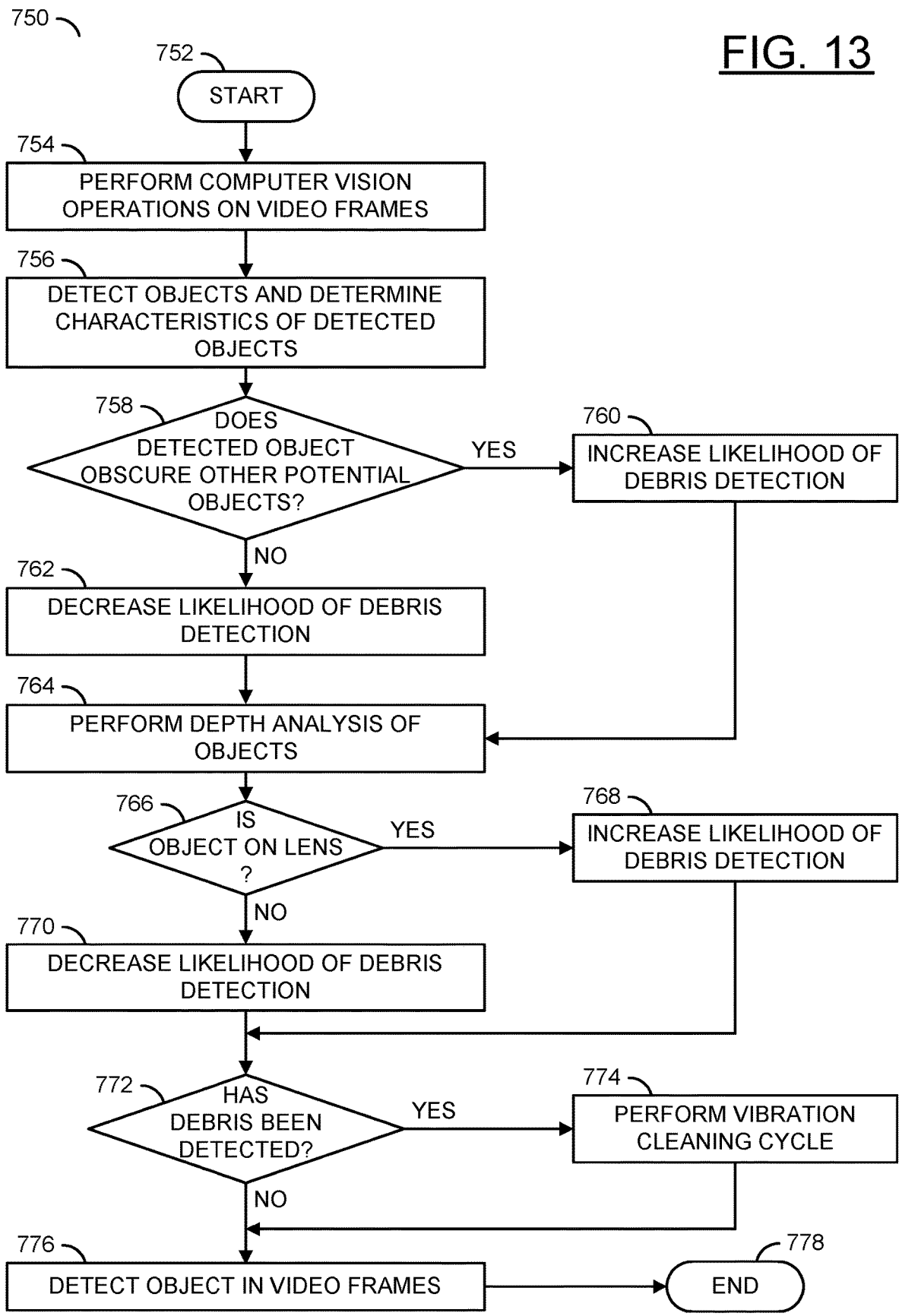
FIG. 13 is a flow diagram illustrating a method for detecting debris on a camera lens using computer vision.

Referring to FIG. 13, a method (or process) 750 is shown. The method 750 may detect debris on a camera lens using computer vision. The method 750 generally comprises a step (or state) 752, a step (or state) 754, a step (or state) 756, a decision step (or state) 758, a step (or state) 760, a step (or state) 762, a step (or state) 764, a decision step (or state) 766, a step (or state) 768, a step (or state) 770, a decision step (or state) 772, a step (or state) 774, a step (or state) 776, and a step (or state) 778.

The step 752 may start the method 750. In the step 754, the CNN module 150 may perform the computer vision operations on the video frames generated. Next, in the step 756, the CNN module 150 may detect the objects and/or determine the characteristics of the detected objects in the captured video frames. Next, the method 750 may move to the decision step 758.

In the decision step 758, the decision module 158 may determine whether one or more of the detected objects obscure other potential objects. For example, a raindrop may obscure a potential objects by distorting the video beyond the location of the raindrop in the video frame. In another example, opaque debris, such as mud may completely block a region of the video frame. If the detected object does obscure other potential objects, then the method 750 may move to the step 760. In the step 760, the decision module 158 may increase a likelihood of detection of the attached debris 300a-300n. Next, the method 750 may move to the step 764.

In the decision step 758, if the detected object does not obscure other potential objects in the video frame, then the method 750 may move to the step 762. For example, the object detected may be a desired object (e.g., a vehicle, a sign, a person, etc.). In the step 762, the decision module 158 may decrease a likelihood of detection of the attached debris 300a-300n. Next, the method 750 may move to the step 764. In the step 764, the processors 106a-106n may perform a depth analysis of the objects. In one example, the processors 106a-106n may perform a monocular depth analysis. In another example, if the camera system 100 implements a stereo camera, a stereo depth analysis may be performed. Next, the method 750 may move to the decision step 766.

In the decision step 766, the decision module 158 may determine whether the object is on the lens 112. For example, the depth analysis may determine how far away the detected object is from the lens 112 (e.g., a distance of zero may indicate the object is attached to the lens). If the object is on the lens 112, then the method 750 may move to the step 768. In the step 768, the decision module 158 may increase a likelihood of detection of the attached debris 300a-300n. Next, the method 750 may move to the decision step 772. In the decision step 766, if the object is not on the lens 112, then the method 750 may move to the step 770. In the step 770, the decision module 158 may decrease a likelihood of detection of the attached debris 300a-300n. Next, the method 750 may move to the decision step 772.

In the decision step 772, the decision module 158 may determine whether the attached debris 300a-300n has been detected. If the attached debris 300a-300n has not been detected, then the method 750 may move to the step 776. If the decision module 158 determines that the attached debris 300a-300n has been detected, then the method 750 may move to the step 774. In the step 774, the processors 106a-106n may generate the signal VCTRL to perform the vibration 302a-302n for the cleaning cycle. Next, the method 750 may move to the step 776.

In the step 776, the CNN module 150 may detect objects in the video frame. For example, once the attached debris 300a-300n has been removed from the lens 112, the processors 106a-106n may be capable of detecting objects (or detecting characteristics of objects) that have been obscured and/or distorted by the attached debris 300a-300n. Next, the method 750 may move to the step 778. The step 778 may end the method 750.

The method 750 may provide a representative example of characteristics of the detected objects that the processors 106a-106n may use to determine the presence of the attached debris 300a-300n. Other criteria may be implemented (e.g., detecting a color, size and/or shape of the detected objects to determine whether the objects detected are debris, determining whether the objects are statically positioned over time, whether the objects are arranged in different patterns on the lenses of a stereo camera, etc.). The various criteria used may have varying amounts of weight applied. For example, the object having a distance of zero from the lens may have a high value weight compared to detecting a particular color. The various weights from analyzing the various criteria may be aggregated to determine a confidence level of whether the determination of the presence of the attached debris 300a-300n may be accurate. For example, when the confidence level is above a pre-determined threshold, then the vibration 302a-302n may be activated.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a cover configured to enable light to reach an image sensor;
an actuator configured to cause a vibration of said cover at a particular frequency in response to a control signal; and
a processor configured to (i) generate image frames from pixel data generated by said image sensor, (ii) perform computer vision operations on said image frames to (a) detect objects in said images frames and (b) determine characteristics of said objects, (iii) analyze said characteristics of said objects to determine whether said objects are debris on said cover and (iv) present said control signal to said actuator in response to detecting a particular type of debris determined by said analysis of said characteristics to initiate said vibration, wherein said particular frequency of said vibration initiated by said control signal from said processor (i) reduces a force that attaches said debris to said cover and (ii) causes said image sensor to capture said pixel data while vibrating with a consistent movement pattern caused by said actuator,
said processor implements image stabilization to counteract said consistent movement pattern of said vibration while said vibration is activated by said processor,
said image stabilization performed by said processor on said image frames is configured to counteract a direction of said vibration that (i) is initiated by said processor and (ii) has said consistent movement pattern that is known in advance, and
said actuator comprises two components configured to operate in antiphase at said particular frequency.

2. The apparatus according to claim 1, wherein said cover comprises a camera lens.

3. The apparatus according to claim 2, wherein said apparatus further comprises a flexible connector configured to connect a barrel of said camera lens to a circuit board to enable said vibration of said camera lens.

4. The apparatus according to claim 3, wherein said flexible connector is implemented using at least one of (a) a rubber material or (b) a plastic material.

5. The apparatus according to claim 1, wherein said cover comprises a protective material fora security camera.

6. The apparatus according to claim 5, wherein said protective material for said security camera comprises at least one of (a) a plastic material or (b) glass.

7. The apparatus according to claim 1, wherein said two components each comprise a piezoelectric component.

8. The apparatus according to claim 1, wherein said particular frequency is approximately 30 kHz.

9. The apparatus according to claim 1, wherein said debris comprises at least one of dust, dirt, rain drops, and snow.

10. The apparatus according to claim 1, wherein (i) said debris causes an obstruction on said image frames and (ii) said vibration is configured to loosen an attachment of said debris to said cover.

11. The apparatus according to claim 1, wherein said processor is further configured to (i) receive an input from an external source and (ii) present said control signal in response to said input.

12. The apparatus according to claim 1, wherein said processor is configured to (i) pause generating said image frames when said vibration is activated and (ii) resume generating said image frames when said vibration has stopped.

13. The apparatus according to claim 1, wherein said processor is configured to perform said image stabilization on said image frames as soon as said vibration is activated.

14. The apparatus according to claim 1, wherein said apparatus is configured to provide waterproof operation.

15. The apparatus according to claim 14, wherein (i) said apparatus further comprises an O-ring and (ii) said O-ring is configured provide a seal to maintain said waterproof operation of said apparatus during said vibration.

16. The apparatus according to claim 1, wherein said vibration is configured to move said cover in a direction perpendicular to the ground below said cover to enable gravity to pull said debris downwards off of said cover in response to said vibration causing said debris to loosen from said cover.

17. The apparatus according to claim 1, wherein
said image stabilization is configured to start and stop along with said vibration.

18. The apparatus according to claim 1, wherein said processor is further configured to perform a second image stabilization independently of said vibration.

* * * * *